US011366426B2

(12) United States Patent
Futterer et al.

(10) Patent No.: US 11,366,426 B2
(45) Date of Patent: Jun. 21, 2022

(54) SPATIAL LIGHT MODULATOR DEVICE FOR THE MODULATION OF A WAVE FIELD WITH COMPLEX INFORMATION

(71) Applicant: SEEREAL TECHNOLOGIES S.A., Munsbach (LU)

(72) Inventors: Gerald Futterer, Metten Bayern (DE); Norbert Leister, Dresden (DE); Ralf Haussler, Dresden (DE); Grigory Lazarev, Berlin (DE)

(73) Assignee: SEEREAL TECHNOLOGIES S.A., Munsbach (LU)

( * ) Notice: Subject to any disclaimer, the term of this patent is extended or adjusted under 35 U.S.C. 154(b) by 413 days.

(21) Appl. No.: 16/356,084

(22) Filed: Mar. 18, 2019

(65) Prior Publication Data

US 2019/0278225 A1 Sep. 12, 2019

Related U.S. Application Data

(63) Continuation of application No. 13/380,178, filed as application No. PCT/EP2010/058626 on Jun. 18, 2010, now Pat. No. 10,234,821.

(30) Foreign Application Priority Data

Jun. 23, 2009 (EP) .................................... 09163528
Sep. 23, 2009 (DE) ....................... 10 2009 044910.8

(51) Int. Cl.
*G03H 1/12* (2006.01)
*G03H 1/08* (2006.01)
(Continued)

(52) U.S. Cl.
CPC ................. *G03H 1/08* (2013.01); *G02B 5/32* (2013.01); *G02B 27/126* (2013.01);
(Continued)

(58) Field of Classification Search
CPC .......... G03H 1/08; G03H 1/12; G03H 1/0248; G03H 1/0841; G03H 1/2645;
(Continued)

(56) References Cited

U.S. PATENT DOCUMENTS

| 4,547,037 A | 10/1985 | Case |
| 4,703,993 A * | 11/1987 | Hinton .................... G02B 5/32 359/15 |

(Continued)

FOREIGN PATENT DOCUMENTS

| DE | 2058418 A1 | 6/1971 |
| DE | 102009028984 A1 | 12/2010 |

(Continued)

OTHER PUBLICATIONS

International Search Report, dated Dec. 7, 2010, issued in priority International Application No. PCT/EP2010/058626 ,Dec. 7, 2010.
(Continued)

*Primary Examiner* — Jennifer D. Carruth
*Assistant Examiner* — Jyotsna V Dabbi
(74) *Attorney, Agent, or Firm* — Saul Ewing Arnstein & Lehr LLP

(57) ABSTRACT

A three-dimensional light modulator, of which the pixels are combined to form modulation elements. Each modulation element can be coded with a preset discrete value such that three-dimensionally arranged object points can be holographically reconstructed. The light modulator is characterized in that assigned to the pixels of the modulator are beam splitters or beam combiners which, for each modulation element, combine the light wave parts modulated by the pixels by means of refraction or diffraction on the output side to form a common light beam which exits the modulation element in a set propagation direction.

17 Claims, 12 Drawing Sheets

(51) Int. Cl.
*G02B 5/32* (2006.01)
*G02B 27/12* (2006.01)
*G03H 1/02* (2006.01)
*G02F 1/1335* (2006.01)
*G02F 1/13363* (2006.01)

(52) U.S. Cl.
CPC .... *G02F 1/13355* (2021.01); *G02F 1/133538* (2021.01); *G02F 1/133631* (2021.01); *G03H 1/0248* (2013.01); *G03H 2001/0858* (2013.01); *G03H 2210/10* (2013.01); *G03H 2223/13* (2013.01); *G03H 2223/18* (2013.01); *G03H 2223/19* (2013.01); *G03H 2223/20* (2013.01); *G03H 2225/34* (2013.01)

(58) Field of Classification Search
CPC ......... G03H 1/2294; G03H 2001/0858; G03H 2001/0224; G03H 2001/267; G03H 2001/2675; G03H 2210/10; G03H 2223/13; G03H 2223/18; G03H 2223/19; G03H 2223/20; G03H 2223/23; G03H 2223/22; G03H 2225/00; G03H 2225/34; G03H 2225/33; G03H 2225/55; G03H 2225/30; G03H 2225/31; G03H 2225/32; G03H 2225/36; G02B 27/10; G02B 27/28; G02B 27/126; G02B 27/283; G02B 27/12; G02B 27/285; G02B 27/0037; G02B 27/0025; G02B 27/286; G02B 5/32; G02B 5/1833; G02B 5/1876; G02B 5/30; G02B 5/3025; G02B 5/3083; G02B 30/25; G02B 26/06; G02B 26/08; G02B 26/0808; G02B 26/0875; G02B 26/0883; G02B 26/0891; G02F 1/133538; G02F 1/13355; G02F 1/133631; G02F 2413/09
USPC .......................................................... 359/11
See application file for complete search history.

(56) References Cited

U.S. PATENT DOCUMENTS

| | | | |
|---|---|---|---|
| 5,416,618 A | 5/1995 | Juday | |
| 5,740,288 A | 4/1998 | Pan | |
| 6,285,473 B1 | 9/2001 | Nishi et al. | |
| 6,630,289 B1 | 10/2003 | Kwok et al. | |
| 6,661,495 B1 * | 12/2003 | Popovich | C09K 19/544 349/1 |
| 6,859,316 B1 | 2/2005 | Huang et al. | |
| 9,442,460 B2 * | 9/2016 | Yoon | G03H 1/2294 |
| 2002/0131027 A1 | 9/2002 | Takezawa et al. | |
| 2002/0168128 A1 | 11/2002 | Chang et al. | |
| 2002/0181048 A1 | 12/2002 | Kuykendall et al. | |
| 2005/0248820 A1 | 11/2005 | Moser et al. | |
| 2006/0098296 A1 * | 5/2006 | Woodgate | H04N 13/305 359/642 |
| 2006/0109876 A1 | 5/2006 | Donoghue et al. | |
| 2008/0204873 A1 | 8/2008 | Daniell | |

FOREIGN PATENT DOCUMENTS

| | | | |
|---|---|---|---|
| EP | 0545524 A1 | 6/1993 | |
| GB | 2384318 A | 7/2003 | |
| WO | 2006119760 A2 | 11/2006 | |
| WO | 2007082707 A1 | 7/2007 | |
| WO | 2008/132206 A1 | 11/2008 | |
| WO | WO-2008132206 A1 * | 11/2008 | ........... G03H 1/2294 |
| WO | 2009050294 A2 | 4/2009 | |
| WO | 2010149583 A1 | 12/2010 | |

OTHER PUBLICATIONS

Kim, et al., Proc. of SPIE, vol. 7093 ,2008 ,709302-1-709302-12.
Komanduri, et al., SID Digest ,May 31, 2009 ,487-490.
Oh,Chulwoo et al., Achromatic polarization gratings as highly efficient thin-film polarizing beamsplitters for broadband light, Proc. SPIE, vol. 6682, No. 628211 ,2007.

* cited by examiner

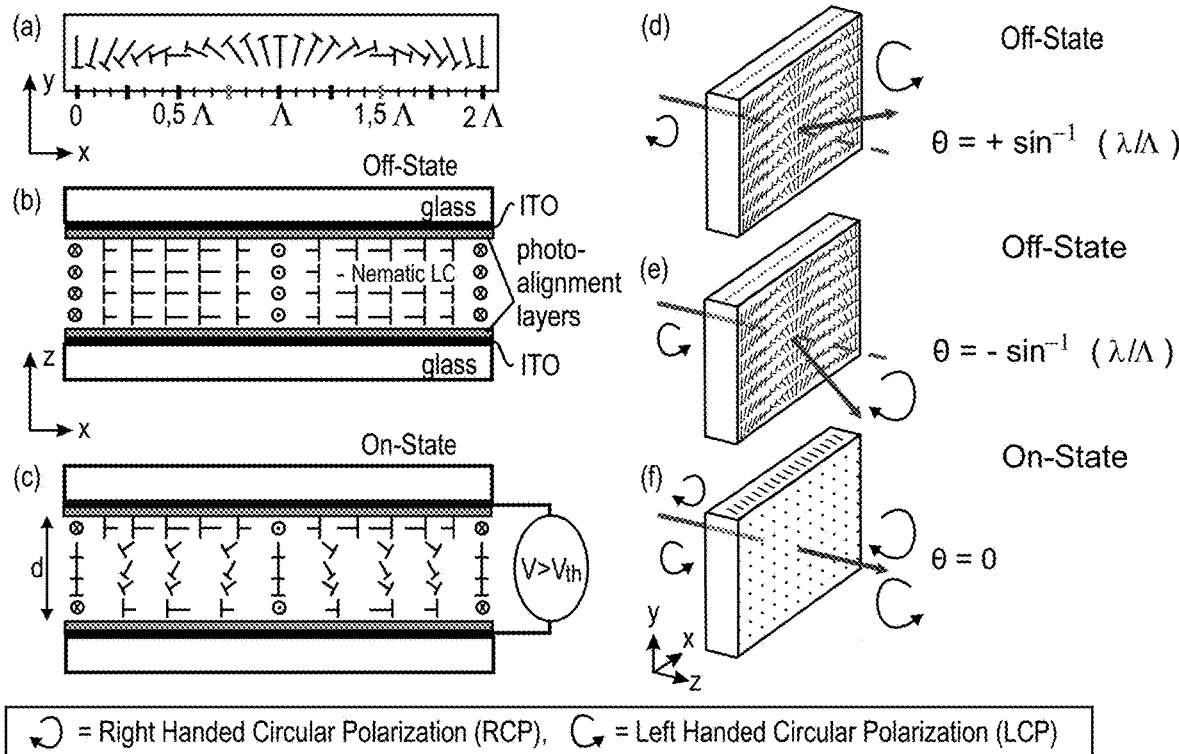
(PRIOR ART)     FIG. 9
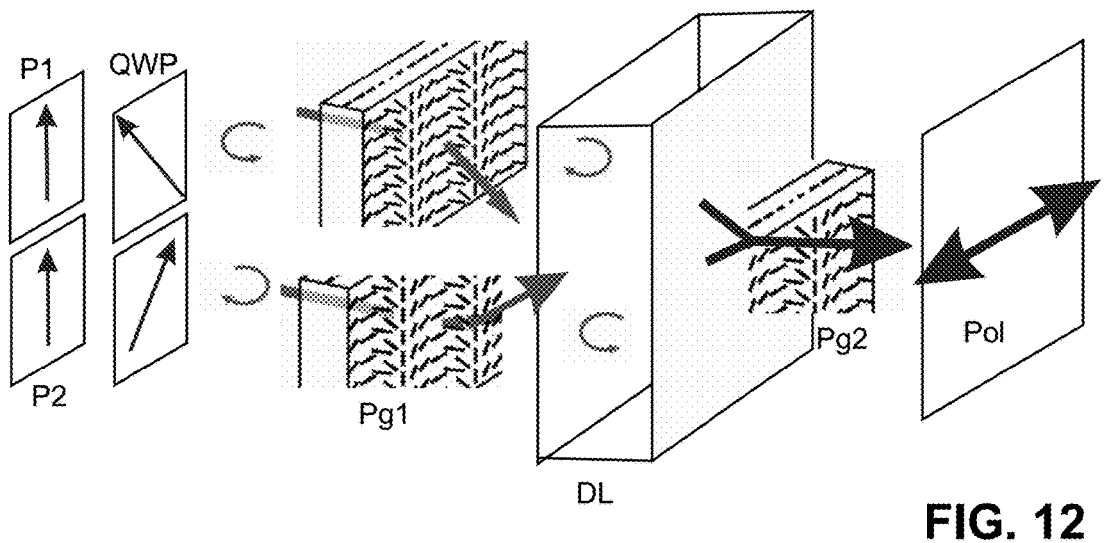
FIG. 12

SPATIAL LIGHT MODULATOR DEVICE FOR THE MODULATION OF A WAVE FIELD WITH COMPLEX INFORMATION

CROSS-REFERENCE TO RELATED APPLICATIONS

This application is a continuation of U.S. application Ser. No. 13/380,178, filed on Dec. 22, 2011, which claims the priority of PCT/EP2010/058626, filed on Jun. 18, 2010, which claims priority to European Application No. 09163528.4, filed Jun. 23, 2009 and German Application No. 10 2009 044910.8, filed Sep. 23, 2009, the entire contents of which are hereby incorporated in total by reference.

BACKGROUND OF THE INVENTION

The present invention relates to a spatial light modulator device for the modulation of a light wave field with video hologram information, in particular with discrete complex object light point values of three-dimensional scenes whose object light points are to be reconstructed holographically. The invention is preferably applicable in the context of a holographic reconstruction system that comprises a position controller, an eye finder and an optical wave tracking means which tracks the optical axis of the propagating modulated light wave field to the actual eye position when an observer who watches the holographic information changes their position. Such a holographic reconstruction system has been disclosed for example in WO 2006/119760 A2.

The invention can be used independent of the way in which the holographic information is provided, and it can also be implemented in a system which allows multiple observers to watch holographically reconstructed video scenes simultaneously.

As is generally known, in order to reconstruct three-dimensional scenes by means of video holography, a light wave generator generates a directed light wave field which emits light waves which are capable of generating interference towards the spatial light modulator device. To allow easy addressability of the light modulator device it preferably comprises a regular structure of modulator elements each of which being encoded by a modulator controller with a discrete complex hologram value in accordance with the spatial arrangement of object light points in a video scene to be reconstructed.

In the present document, 'encoding' shall be understood to be the discrete adjustment of the optical transmittance of modulator cells of the light modulator device. As a result of this encoding, the modulator cells modulate incident light wave portions of the light wave field which is capable of generating interference such that multiple emitted light wave portions reconstruct by way of constructive or destructive interference the plurality of object light points of a scene that is described by a video signal in the space on the optical path downstream of the spatial light modulator means, seen in the direction of light propagation.

In the context of the present invention, discrete complex hologram values carry holographic information for discrete encoding of a modulation array with a video hologram. The modulator controller writes to each modulator element components of the holographic code, such as a real part and an imaginary part in terms of complex numbers, in order to affect amplitude and/or phase of the light transfer function of each modulator element.

Conventional light modulator devices usually serve either as amplitude-only modulators or as phase-only modulators, thus only influencing the light waves with a single real value. This means that these modulators locally change either the amplitude only or the phase information only through their cell encoding.

In video holography, light modulator devices must be capable of working in real-time, and they must be able to produce full-colour reconstructions in a large reconstruction space.

Each light modulator device comprises at least one modulation array with regularly arranged modulator elements, where each modulator element comprises a number of modulator cells. A modulation array is typically realised by a spatial light modulator (SLM). Such a spatial light modulator has individual modulator cells, commonly also known as pixels.

According to the principle of hologram reconstruction, the modulator controller simultaneously computes discrete complex hologram values for all modulator elements which are involved in the holographic reconstruction of an object light point based on the corresponding discrete complex value of the object light point of the scene. Corresponding code value components are generated for each discrete complex hologram value prior to the encoding process. The code value components for each modulator element are computed and mutually adjusted such that all modulator cells of each modulator element interact such that the complex local light modulation which is expected from the modulator element is actually achieved. The complex object light point values are computed by the modulator controller prior to the encoding for example based on a video signal with depth information.

Document U.S. Pat. No. 5,416,618, for example, discloses a light modulator device which comprises a combination of multiple stacked spatial light modulator arrays. For example, one light modulator array with amplitude light modulator cells and one with phase light modulator cells, or two arrays with light modulator cells of the same kind, are stacked in the direction of light propagation. This stacking generates the modulator elements which comprise multiple single cells and which modulate a light wave field with complex hologram values. It is a disadvantage here, however, that when the light modulator arrays are adjoined, considerable adjustment efforts must be made in order to realise exact congruence of the cell structures.

This disadvantage does not occur though where a complex hologram value is realised by a group of multiple modulator cells of one modulation array, in particular when the multiple modulator cells are arranged side by side in respect of the direction of light propagation.

The light modulator device according to the present application therefore comprises at least one modulation array with regularly arranged modulator cells which can be encoded discretely but which are combined to form joint modulation elements as regards their optical effect and their electrical addressing. The modulation elements of the light modulator device are arranged in an array and modulate in a spatially structured way the light waves which are capable of generating interference of the propagating light wave field. This means that each modulation element only changes a light wave portion of the propagating light wave field which actually hits the modulation array in accordance with the actual hologram value for the modulation element. For this, the modulator controller provides for each individual modulator cell a separate value component of the complex object scanning value which is assigned to the modulation element.

Each modulation element thus comprises a combination of modulator cells, where the modulator cells can be realised in the form of phase-modulating light modulator cells or amplitude-modulating light modulator cells. This means that, depending on the design and local arrangement of the modulator cells, each modulation element can modulate a light wave portion of the impingent propagating light wave field as regards its wave phase with one modulator cell and its wave amplitude with the other modulator cell, or as regards its wave phase or wave amplitude only with all modulator cells.

The general principle of the spatial light modulation as described above with modulation elements which provide phase modulation only, which can be addressed irrespective of each other with different value components per modulation element, e.g. according to the two-phase encoding method, has already been described by the applicant in document WO 2007/082707 A1.

The above-mentioned publication shows a preferred way of encoding a spatial light modulator device with multiple phase values. A complex object scanning value is represented by a sum of two phase components with same absolute amplitude value and different phase values and encoded to two adjacent phase-modulating light modulator cells of the same modulation array. This means that each complex object scanning value with the phase ψ and amplitude a ranging between 0 and 1 is thus composed of the sum of two complex phase components with the same amplitude value and the phase values ψ±a cos a. It is also mentioned in the international patent publication that the number of phase modulator cells that constitute a modulation element is not necessarily limited to two.

A spatial light modulator device which provides phase modulation only has great advantages over light wave modulation with modulator cells for amplitude modulation. A light modulator device with two-phase encoding shows the reconstruction at greater brightness, because the modulator cells realise maximum light transmittance with each phase setting. Another advantage of the two-phase encoding method is that it provides a more favourable wavelength dependence during reconstruction, which allows colour video scenes to be reconstructed at high quality.

The mentioned two-phase encoding method is meant to achieve the situation that those light wave portions of the light wave field which is capable of generating interference which are modulated by adjoined modulator cells of a modulation element show the same optical interference effect as those light wave portions which are modulated by such a single modulator cell that is simultaneously addressed with all phase components of a complex object scanning value.

However, this is difficult to be realised because the modulator cells which are combined to form a modulation element lie side by side in the modulation array, thus having a spatial offset and showing differences in the length of the optical path, also known as retardation, with a magnitude that depends on the kind of hologram, on the eye position of an observer who sees reconstructed object light points, and—for example with Fourier holograms—on the position of the object light point which is to be reconstructed by these modulator cells. This offset of the modulator cells effects phase differences among the modulator cells of the modulation elements, said phase differences depending on the position of an observer eye and from the desired angular position of the reconstructed object point in respect of the optical axis of the system (depending on the kind of hologram) and impairing the quality of the reconstruction of the video scene, so that they require correction of each modulation element. In a holographic reconstruction system with position controller and eye finder, which, as described above, track the propagating modulated wave field optically upon a change in an observer position, it is also very advantageous to have a tolerance in the observer position of a few millimetres around the eye position which has been detected by the eye finder. The occurring differences in the optical path lengths would substantially restrict this slight freedom of movement of an observer in front of the holographic reconstruction system while watching a holographic reconstruction.

A solution to this problem has been suggested in the international patent application WO 2008/132206 A1 titled "Light modulator for representing complex-valued information". According to this solution, a structured retardation layer made of a birefringent material is arranged in the optical path of the modulation array, i.e. upstream and/or downstream of the modulation array and preferably in close contact with the modulator cells, said layer effecting an angular-position-specific adaptation of the optical path length of the emitted modulated light wave portion to the lengths of the optical paths through the other cells of the modulation element at least for one modulator cell of each modulation element. The layer thickness of this retardation layer is chosen such that the retardation layer counteracts the angular-position-specific change in the optical path among the modulator cells of each modulation element by way of changing the optical path lengths and compensates them at least partly. This solution has the disadvantage that it requires a very finely structured but at the same time rather thick layer.

The device disclosed in the unexamined application DE 2 058 418 titled "Device for determining the position of an object in an arbitrary section of a pencil of rays" takes advantage inter al. of a point light source and a Savart plate. That Savart plate comprises two serially arranged birefringent uniaxial plate-shaped crystals which are arranged such that their main sections are turned to a perpendicular situation, where the angle of the optical axis and the crystal surface is the same for both crystals. The document teaches that the Savart plate divides the pencils of rays which are originally emitted by an point light source and which are incident on its entry side into two linear-polarised partial pencils which show mutually perpendicular polarisation and appear to origin in two linear-polarised virtual light sources which lie on the entry side in a plane in symmetry with the original light source. The document further teaches that there is no difference in optical path length among partial pencils of rays which show mutually perpendicular polarisation in each point of the plane to which the virtual light sources are arranged in mirror-symmetrical arrangement. In any other points, there are differences in optical path length among the partial pencils.

In the present invention, the term 'Savart plate' is used to designate any at least one single birefringent plate-shaped uniaxial crystal. Further, the birefringent material shall not be limited to conventional crystals such as quartz or calcite, but can also be generated for example by an oriented polymer and/or a suitable polymer layer or suitable film.

In the context of the present invention it is immaterial how the modulator cells are actually designed. It is for example possible to use a modulation array of liquid crystal cells or of electrowetting cells. The modulator cells can be of such nature that the modulation array modulates the light waves of the wave field during their passage or when being reflected.

An alternative to a spatial light modulator device with phase-modulating light modulator cells can be a modulation array which exclusively comprises amplitude-modulating light modulator cells, where each modulation element is composed of multiple amplitude-modulating light modulator cells. An encoding method for a light modulator device which comprises two amplitude-modulating light modulator cells, namely one for the real part and one for the imaginary part of a complex number, is known as bias encoding. Another encoding method for a light modulator device which comprises three amplitude-modulating light modulator cells is known as Burckhardt encoding.

A phase error which substantially impairs the quality of the reconstruction always occurs in a complex modulation element with multiple adjoining modulator cells as a consequence of the angular-position-specific difference in the optical path lengths among the individual modulator cells, irrespective of the nature of the modulator cells of the modulation array.

SUMMARY OF THE INVENTION

It is thus the object of the present invention to provide compensation means which compensate the differences in the optical path lengths among the staggered modulator cells of one and the same modulation element in a spatial light modulator device comprising complex modulation elements with multiple modulator cells which are arranged at laterally staggered positions. In addition, the compensation shall be at least widely independent of variations in the light wavelengths which are used for modulation, which occur for example as an effect of temperature changes in the light sources which serve to generate the light wave field.

A modulated light wave portion which leaves a modulation element shall have the same effect in the holographic reconstruction as if the light wave portion originated in a single compact modulator cell which can be modulated with discrete complex hologram values. Light wave portions which are thus treated by the means of this invention cannot show inherent phase differences caused by differences in the optical path lengths.

The present invention is based on a light modulator device which comprises at least one modulation array which is composed of individual or discretely encodable modulator cells. The modulator cells are combined to form modulation elements. The modulator cells can modulate light waves which are capable of generating interference of a propagating light wave field with holographic information in a spatially structured way. The modulator cells of each modulation element are arranged side by side in the modulation array in respect of the direction of propagation of the propagating light wave field, and each modulation element can be encoded with a presettable or discrete complex object scanning value in order to reconstruct or represent spatially arranged object light points holographically.

In order to circumvent said disadvantages, according to the present invention, in the light modulator device, the modulator cells of the modulation array are assigned with light wave multiplexing means with which the light wave portions which are modulated by the modulator cells can be combined for each modulation element on the exit side by way of refraction or diffraction to form a modulated light wave multiplex such that the modulated light wave multiplex leaves the modulation element substantially through a common position, i.e. substantially spatially overlapped, and substantially in a common direction of propagation.

In the context of the present invention, 'light wave multiplexing means' or 'optical multiplexing means for space division multiplexing of exiting light wave portions' shall be understood in the present document to be structured optical arrangements which deflect light wave portions which hit an entry-side interface of the optical arrangement at different positions substantially in a parallel directed manner inside the optical arrangement or component unit by a structure of wave deflection elements such that at least certain light wave portions leave the optical arrangement through a common exit position in an exit-side interface in a substantially common direction of propagation.

The optical multiplexing means for space division multiplexing is preferably designed in the form of a flat optical plate unit which is arranged as close as possible to the modulation array and which has an areal structure of optical wave deflection means whose shape, size and position are congruent to and match those of the modulator cells of the modulation elements and where at least for a part of the modulator cells the exit position of the light waves is arranged at an offset to the entry position of the light waves.

The desired spatial light wave multiplexing per modulation element is achieved in that at least some of the modulator cells of each modulation element are assigned with wave deflection elements which have inside an optical transfer axis which differs from the system axis of the modulation array, so that the light wave portions of all modulator cells of each modulation element exit through said common exit position in an exit-side interface in a common direction of propagation. The optical multiplexing means realise an individual wave exit position for each modulation element.

The optical means for space division multiplexing can be structured flat optical elements such as film arrangements which include volume holograms, micro-prism arrays and/or birefringent optical elements whose structure is matched to the shape, size and position of the modulator cells of the modulation elements.

Polarisation Gratings as Beam Combiners

If light portions which pass through different modulator cells cover different optical path lengths, it is generally necessary in order to maintain a defined or desired light interference effect that the difference in the optical path lengths between the portion of light which passes through one modulator cell and the portion of light which passes through the other modulator cell is corrected with the help of an offset phase. Additionally, there are temperature-fluctuation-induced path length variations among the light portions which pass through different modulator cells, as already mentioned above.

This can be achieved for example by an arrangement with symmetric light deflection as shown in FIG. 8. First the light which comes from the one modulator cell, and in the next part of the arrangement the light which comes from another modulator cell (pixel) is deflected by half the distance between modulator cell centres or pixel pitch. Such an arrangement requires either two Savart plates which are turned at an angle to each other or altogether four instead of two volume gratings (see FIG. 6 or 7) and, additionally, a polarisation-turning layer between the two Savart plates or between the two pairs of volume gratings, respectively.

Besides volume gratings, other types of grating structures are known as well, for example polarisation gratings. They serve as diffraction gratings or for beam deflection at maximum efficiency in only one of the first orders ($+1^{st}$ or $-1^{st}$ order only), in contrast to other known gratings which often show 50% efficiency in the +1$^{st}$ and 50% efficiency in the −1$^{st}$ diffraction order.

While 50% of linearly polarised light is deflected in the +1$^{st}$ and 50% in the −1$^{st}$ diffraction order by a polarisation grating, it has the property of deflecting 100% of circularly polarised light in only one of those 1$^{st}$ orders. In which order depends on whether right-handed or left-handed circularly polarised light falls on them.

Further, achromatic polarisation filters are known as well which comprise a high diffraction efficiency for different wavelengths, which is described in citation [1].

It is a further object of the present invention to realise a combination of two phase pixels and an arrangement of a minimum number of grating structures such that both phase pixels have symmetrical beam paths, thus showing more tolerance e.g. as regards thickness differences caused by the temperature and other ambient conditions.

This is achieved in that, first, in contrast to known methods a structured λ/4 layer (instead of the λ/2 layer) is arranged at the point of exit of the two phase pixels.

Through a different orientation of the λ/4 layers at the two modulator cells or pixels, based on a linear polarisation at the point of exit of the modulation array or SLM, the light emitted by one of the two phase pixels of a modulation element (macro-pixel) is given left-handed circular polarisation, while the other one is given right-handed circular polarisation.

Secondly, polarisation gratings are used instead of volume gratings. The polarisation grating deflects light coming from the two phase pixels in opposite directions, because of their different circular polarisation. The light coming from both pixels then runs through a spacer—an element that is designed similar to the stack of volume gratings—and moves towards each other, but in this case symmetrically. Since both beams are deflected, the spacer can be of thinner design than with volume gratings, which is another advantage over the latter. The polarisation of the light is straightened again by a second polarisation grating, or rather deflected from two different directions of propagation into a common direction of propagation.

Subsequently, a polariser combines the superposed light to form a complex value—the same step as with Savart plates or volume grating stacks. However, this polariser has an orientation of the transmittance direction which is turned by 45°, compared to that in an arrangement with Savart plate or volume gratings, namely vertical or horizontal.

This can be described by a Jones matrix equation.

Right-handed circularly polarised light has a Jones vector which is proportionate to $$\begin{pmatrix} 1 \\ j \end{pmatrix}$$

Left-handed circularly polarised light has a Jones vector of $$\begin{pmatrix} 1 \\ -j \end{pmatrix}$$

If the light of the two phase pixels (modulator cells) has the phases φ1 and φ2, respectively, their sum has the vector $$\begin{pmatrix} e^{j\varphi 1} + e^{j\varphi 2} \\ j(e^{j\varphi 1} - e^{j\varphi 2}) \end{pmatrix}$$

A horizontal polariser has the Jones matrix $$\begin{pmatrix} 1 & 0 \\ 0 & 0 \end{pmatrix}$$

This means that downstream of the polariser a complex number $$e^{j\varphi 1} + e^{j\varphi 2}$$

is realised, as is intended in two-phase encoding.

Alternatively, with a vertical polariser the complex number $$e^{j\varphi 1} - e^{j\varphi 2}$$

would be represented.

This corresponds with the results that would be achieved for volume gratings, linearly polarised light and polarisers under +45° or −45°.

The beam combining shall be achieved in a colour display in particular for red, green and blue light.

An achromatic grating as described in cit. [1] can be used. However, it is also possible to use a more simple grating, which is only optimised for one wavelength. Other wavelengths then suffer from diffraction losses. However, the non-diffracted light can be blocked by apertures so that it does not disturb the observer who looks at an holographic display.

Further, a deflection angle which changes as the wavelength varies can be compensated by apertures, as has been proposed in the context of the solutions described above.

FIG. 9 illustrates the functional principle of a prior art polarisation grating according to cit. [2]. The drawing shows a dynamic element. However, it is intended to use passive elements in the context of this invention.

FIG. 10 shows the beam path in a volume grating (non-symmetrical). Pixel P01 is followed by a λ/2 plate with a first orientation, and pixel P02 is followed by a λ/2 plate with a different orientation. FIG. 11 shows the beam path in an arrangement with polarisation gratings (symmetrical). Pixel P01 is followed by a λ/4 plate with a first orientation, and pixel P02 is followed by a λ/4 plate with a different orientation.

FIG. 12 shows an exemplary arrangement: two pixels (encodable modulator cells) P1, P2, which emit linearly polarised light (filled red arrows), are followed by a structured λ/4 layer QWP. The optical axis which is turned by +45° for the one pixel, P1, and by −45° for the other pixel, P2, to the direction of polarisation of the light which is emitted by the SLM (modulation array) and through which circularly polarised light is generated (indicated by red circular arrows) is shown in the diagram.

According to the embodiment shown in FIG. 12, a first polarisation grating Pg1 deflects the light according to its polarisation. Once the light has passed a spacer DL (thin glass plate or polymer film) of suitable thickness and once it is spatially superposed, it is deflected in opposite directions by a second polarisation grating Pg2, so that the light which comes from the two pixels leaves parallel. Downstream of those elements, a linear polariser Pol is arranged either at 0° or at 90°.

Polarisation gratings have the property of changing the direction of rotation of circular polarisation, i.e. from right-handed circular polarisation to left-handed circular polarisation and vice versa (which is also indicated in the drawing).

This property is very advantageous for the application as a beam combiner, because it allows the use of two gratings of the same kind (i.e. with identical orientation of the molecules in the grating) in the arrangement.

Circular polarised light is deflected by the first grating, thereby changes the direction of rotation of its polarisation, and is thus deflected in the opposite direction by the second grating of the same kind. Two gratings of the same kind which are arranged one after another in the optical path thus lead to the desired parallel offset.

According to a preferred embodiment, the light wave multiplexing means insofar comprises at least a polarisation means and a first and a second deflection layer Vg1 and Vg2. The polarisation means serves to assign to the light which passes through a first modulator cell 1 a presettable first polarisation. The polarisation means further assigns to the light which passes through a second modulator cell 2 a presettable second polarisation. The first deflection layer Vg1 is arranged downstream of the polarisation means, seen in the direction of light propagation. The first deflection layer Vg1 is then followed in the direction of light propagation by the second deflection layer Vg2 at a defined distance d. The presettable first polarisation can be perpendicular to the presettable second polarisation. Alternatively, the presettable first polarisation can be circular and have an opposite direction of rotation compared to a presettable second circular polarisation. If the light already has a suitable structured polarisation, e.g. due to the properties of the light source used, it is not generally necessary to use a polarisation means.

Referring to FIG. 7, the optical property of the first deflection layer Vg1 is chosen such that the light which passes through the first modulator cell 1 is substantially not deflected while the light which passes through the second modulator cell 2 is deflected by a first defined angle. The optical property of the second deflection layer Vg2 is chosen such that the light which passes through the first modulator cell 1 is substantially not deflected while the light which passes through the second modulator cell 2 is deflected by a second defined angle. The absolute value of the second defined angle is substantially identical to the absolute value of the first defined angle.

Referring to FIG. 8, the second deflection layer Vg2 is followed by a third and fourth deflection layer Vg3, Vg4 at defined distances in the direction of light propagation. The optical property of the third deflection layer Vg3 is chosen such that the light which passes through the first modulator cell 1 is deflected by a third defined angle while the light which passes through the second modulator cell 2 is substantially not deflected. The optical property of the fourth deflection layer Vg4 is chosen such that the light which passes through the first modulator cell 1 is deflected by a further, fourth defined angle while the light which passes through the second modulator cell 2 is substantially not deflected. The absolute value of the third defined angle can be substantially identical to the absolute value of the fourth defined angle.

The polarisation means can comprise a retardation plate having a plurality of regions which are characterised by different orientations. This is particularly preferable where the functional principle of the modulator cells is already based on polarised light, or at least where their function is not adversely affected by the use of polarised light. Otherwise, a structured polariser with multiple regions having different orientations must be used in which light of a certain polarisation direction is absorbed. However, this would be associated with a loss of light. In this context, a structured polariser shall in particular be understood to be a polariser which comprises first spatial regions and second spatial regions which assign to the light which interacts with the polariser certain presettable polarisations, where the first spatial regions are assigned to one class of modulator cells and the second spatial regions are assigned to another class of modulator cells. The retardation plate can be a $\lambda/2$ plate or a $1x+\lambda/2$ or $1x-\lambda/2$ plate, i.e. the retardation plate comprises a relative phase shift of $\lambda/2$. Alternatively, the polarisation means can comprise a first retardation plate having a first orientation and a second retardation plate having a second orientation. The first and the second retardation plate can each be a $\lambda/2$ plate. The first retardation plate having the first orientation is then assigned to the light which passes through the first modulator cell 1. The second retardation plate having the second orientation is assigned to the light which passes through the second modulator cell 2.

Referring to FIGS. 11 and 12, the optical property of the first deflection layer Pg1 is chosen such that the light which passes through the first modulator cell P01 is deflected by a first defined angle into a first direction while the light which passes through the second modulator cell P02 is deflected by a second defined angle into a second direction. The optical property of the second deflection layer Pg2 is chosen such that the light which passes through the first modulator cell P01 is deflected by the second angle while the light which passes through the second modulator cell P02 is deflected by the first angle. The absolute value of the first angle can be substantially identical to the absolute value of the second angle.

The polarisation means can comprise a retardation plate having a plurality of regions which are characterised by different orientations. This is particularly preferable where the functional principle of the modulator cells is already based on polarised light, or at least where their function is not adversely affected by the use of polarised light. Otherwise, a structured circular polariser with multiple regions having different orientations must be used. However, this would be associated with a loss of light. The retardation plate can be a $\lambda/4$ plate or a $1x+\lambda/4$ or $1x-\lambda/4$ plate, i.e. the retardation plate comprises a relative phase shift of $\lambda/4$. Alternatively, the polarisation means can comprise at least a first retardation plate having a first orientation and a second retardation plate having a second orientation. The first and the second retardation plate can each be a $\lambda/4$ plate. The first retardation plate having the first orientation is in this case assigned to the light which passes through the first modulator cell P01. The second retardation plate having the second orientation is assigned to the light which passes through the second modulator cell P02.

A deflection layer Vg1, Vg2, Vg3, Vg4, Pg1, Pg2 can be a layer that comprises a hologram and/or a volume grating and/or a Bragg grating, or a polarisation grating.

A polarisation means WGP, Pol with presettable optical property which has the effect of an analyser can be arranged downstream of the deflection layer Vg1, Vg2, Vg3, Vg4, Pg1, Pg2 in the direction of light propagation.

In all embodiments of the present invention, an apodisation element APF can be provided which affects the light beams of a modulation element ME which have been combined to form a modulated light multiplex. The apodisation element APF can comprise in a direction transverse to the direction of light propagation a neutral intensity profile which is substantially independent of the respective wavelength of the used light. Such an intensity profile can be described by an analytically writable apodisation function, e.g. a cosine or triangular or Blackman or Hamming or Welch window function. Specifically, the apodisation element APF can have corresponding apodisation masks each of which being assigned to one modulation element ME. Such an apodisation mask, for example as shown in FIG. 16 on the left in a side view, then affects the modulated light wave multiplex of combined light beams of that modulation element ME. The apodisation mask can for example be arranged downstream of the polariser WGP, which serves as analyser, that is at the position denoted by PC in FIG. 13.

For colour applications, an adequately designed apodisation element APFC can be provided which affects the light beams of a modulation element ME which have been combined to form a modulated light multiplex. The apodisation element APFC has at least two intensity profiles which are dependent on the respective wavelength of the used light. The intensity profiles are mutually shifted by a presettable value laterally in a direction transverse to the direction of light propagation. This is shown in FIG. 16 on the right in a side view. The intensity profiles can be contained in individual layers APFSR, APFSG, APFSB which are arranged one after another in the direction of light propagation.

Manufacture of Passive Layers

Citations [1] and [2] describe actively switchable LCPG.

They are manufactured such that orientation layers of a photo-polymerisable material are exposed to UV radiation. Two UV light sources with opposite circular polarisations are used and their light is superposed. The grating constant is set through the relative angle at which the light sources are superposed. If substrates with adequate orientation layers exist, an LC layer whose thickness is for example defined by spacer balls is filled in between the substrates.

Other LC materials are known from other applications which are cross-linked on a substrate after having been oriented, so that their orientation is quasi frozen. As regards the application as beam combiners, passive LCPG are preferably used. Therefore, the use of polymer materials is proposed here.

Beam Combiner for RBG

There are two different effects with view to the wavelength of the used light which need to be considered.

(a) The diffraction efficiency of a grating generally changes with the wavelength. This effect typically depends on the thickness of the grating.

(b) The diffraction angle also generally changes with the wavelength. It is dependent on the ratio of wavelength to grating constant.

Re (a) diffraction efficiency:

Prior art citation [1] describes a special polarisation grating which comprises a high diffraction efficiency throughout the entire visible range. However, that grating still has different angles for red, green and blue light.

It is further described in the prior art to change the effective birefringence in an active LCPG by respectively controlling and partially orienting the LC molecules in the array such that the equation $d \, \Delta n_{eff}(V)=\lambda/2$ is optionally satisfied for different wavelengths depending on the applied voltage.

This also raises the diffraction efficiency but does not change the diffraction angles. That element can be used as a beam combiner in a holographic display with time division multiplexing of colours, where the grating is adapted to the actually processed colour by applying a respective voltage. An active grating assumes that the grating itself is addressed and this addressing is synchronised with the control of the light sources and SLM.

For a spatial multiplexing of colours there would be the possibility to apply different voltages to the LC material to individual pixel columns during the manufacturing process and to polymerise it in that state.

Re (b) Diffraction Angle:

As regards the use as a beam combiner, great importance is in particular attached to achieving same diffraction angles for red, green and blue light. The above-mentioned approaches do not satisfy this requirement.

A preferred possibility of achieving identical diffraction angles is to perform space division multiplexing of the grating periods in agreement with a space division multiplexing of the colours of the SLM. For this, a mask is used during the exposure of the orientation layers of the substrates (see Section "Manufacture of passive layers" above), said mask covering in stripes about ⅔ of the area, namely that part which corresponds with the colour pixels of the two other colours. The angle of the two exposing UV light sources is then adapted such to achieve a desired grating constant for one colour (RGB). This process is repeated three times with the mask shifted and the angle altered accordingly.

In contrast to Bragg gratings, where multiple gratings can be superposed or arranged one after another in series arrangement, three interleaved gratings are obtained here which are not superposed.

A combination of the prior art grating structure according to citation [1] for a high diffraction efficiency for all wavelengths can be combined with this embodiment for an identical diffraction angle of the individual wavelengths.

Alternatively, the method can also be used on its own if a high diffraction efficiency is to be achieved for one wavelength and for other wavelengths the non-diffracted light is filtered out otherwise so that it does not get though to the observer. This can be done by taking advantage of exit position, exit angle or, as the case may be, polarisation of that light.

Numeric Examples

According to the prior art, the ratio of layer thickness to grating constant is limited in polarisation gratings. This limit also depends on material properties of the LC, e.g. its birefringence.

Since the condition $d \, \Delta n=\lambda/2$ must be satisfied for the layer thickness d (where $\Delta n$ is the refractive index difference and $\lambda$ is the wavelength), there is a minimum grating constant and, consequently, a maximum deflection angle.

Gratings with a grating constant of about 6 µm have already been described in experimental setups. Theoretical limits are likely to be around 2 µm. The consequent deflection angles are about (2 times) 5 degrees.

It can be assumed that the arrangement of grating+spacer+grating typically has a thickness of about ½ to ⅓ of that of a Savart plate made of a material with same refractive index difference $\Delta n$. However, in such arrangement, the polarisation grating itself is only few micrometres, typically 2-3 µm, thick. The spacer would have a thickness ranging between 200-300 µm (with a grating constant of about 4-6 µm) for a pixel pitch of 60 µm.

Polarisation Grating Stack

Another possibility is to use a stack of multiple polarisation gratings which are arranged one after another instead of a single polarisation grating. Polarisation gratings are sensitive as regards the angle of incidence.

However, when using passive gratings with a fix total deflection angle, it is possible to optimise subsequently arranged gratings in respect of a successively larger angle of incidence.

The deflection angle can thus generally be increased and the total thickness reduced in that multiple polarisation gratings are arranged in series arrangement.

Achromatic Refractive Beam Combination

As has been shown above, there is a refractive solution (Savart plate) and a diffractive solution (volume gratings) to the object of combining two phase-shifting pixels (modulator cells) to form a resultant secondary pixel (modulator element) which generates complex values, i.e. which is capable of modulating or varying both phase and amplitude of the light that passes through those pixels.

It is a particular purpose of this document to propose an achromatic option of the refractive solution in the context of sequential colour representations.

FIG. 13 shows the generation of a complex-valued pixel with the help of two phase pixels. The drawing shows the Savart plate SP, which is combined with a structured half-wavelength plate λ/2 and a polariser WGP to generate a complex-valued pixel PC. The exemplary cosine-shaped apodisation profile of the resultant pixel is not shown in the drawing, i.e. the pixel is shown as a uniformly transparent pixel. The refractive index difference between ordinary and extraordinary axis is $\Delta n_{oe}=0.2$, which corresponds to a deflection angle of the TM polarised light of $\alpha_{TM}=7.384°$ and a 0.1296 µm beam offset per micrometer plate thickness. FIG. 13 shows these relations to scale.

In a birefringent material, the extraordinary beam propagates at a certain relative angle to the ordinary beam. However, at the point of exit of the birefringent material into an optical isotropic medium, ordinary and extraordinary beam are directed to be parallel again. Light of a certain polarisation is thus given a deflection by an angle that depends both on the magnitude of birefringence and the orientation of the optical axis of the birefringent material at the entry-side interface of the birefringent material, and a deflection in the opposite direction at the at the exit-side interface. A parallel offset is thus observed whose magnitude depends on the thickness of the birefringent body. This effect is particularly well observed if the birefringent material has the form of a coplanar plate.

FIG. 14 illustrates the problem of dispersion in sequential representations. The drawing shows the Savart plate SP which, caused by the dispersion n=n (λ) for the red and blue wavelength, bears an error Δs in the lateral offset s. If in the Savart plate SP the design angle which lets the beam of the green wavelength lie centrally on the for example cosine-shaped apodisation profile (not shown) is used for the TM-polarised beam, then a larger angle is obtained for the blue beam and a smaller angle is obtained for the red beam, thus causing a positive or negative beam offset, respectively, i.e. a beam offset towards the one or respective other side of the apodisation profile.

In the context of a sequential colour representation, the problem is that the apodisation filter of an individual complex-valued pixel is not illuminated centrally by two colours, i.e. red and blue in this example.

A simple solution would be to reduce the dimensions of the apodisation profile, i.e. to cut the fill factor FF from 0.8 to 0.6, for example. However, this means to cut off almost 50 percent of the transparent area, or to eliminate 50 percent of the radiant emittance through absorption. Moreover, the efficiency of the suppression of diffraction orders neighbouring the observer window is trimmed down when the fill factor is reduced.

Another solution is to perform space division multiplexing of the colours used, i.e. to use a spatially structured arrangement of colour filters, which is unproblematic for one-dimensionally encoded 3D objects, that is for horizontal parallax only (HPO) holograms, for example. This is a practicable way if enough pixels are available to provide a 3D reconstruction that goes clearly below the resolving capacity of the human eye. This is illustrated in FIG. 15, namely in the form of space division multiplexing of phase pixels which are combined to form complex-valued pixels. For example, the first column S1R on the left has a red filter. The column S2B on the right of the latter (with an absorbing black column SB in between) has a blue filter. The column S2G on the right of the latter (with an absorbing black column SB in between) has a green filter. This arrangement continues periodically.

Another solution is to use a colour-selective apodisation filter distribution instead of a 'neutral density apodisation profile', i.e. an intensity or transmittance filter profile in the form of a distribution of greyscale values. This is shown in FIG. 16, namely in the form of a transition from a greyscale-value-or neutral-density-type apodisation function (left, filter denoted by APF) to a laterally offset colour-selective apodisation function (right, filter denoted by APFC). In analogy with the layer structure of reversal films for colour transparencies or slides, a colour-selective filtering can for example be achieved in subsequently arranged layers APFSR (red), APFSG (green) and APFSB (blue). To solve the problem, the points of maximum transmittance depend on the respective spectral colour. However, the fill factor can be the same for all colours. Moreover, colour-selective modifications of the apodisation function can be conducted e.g. in order to spectrally optimise the energy efficiency or the suppression of diffraction orders neighbouring the observer window.

Referring to FIG. 16, the centre of the intensity distribution is shown to have a spectrally different lateral offset which cannot be perceived in the holographic reconstruction with a holographic direct-view display, because it is smaller than for example 10 µm.

Yet another solution is to use at least two different birefringent materials SP1, SP2, which show different, i.e. normal and anomalous dispersion. This means that the Savart plate is made up of two layers SP1, SP2, where for example the first layer SP1 has the highest refractive index for the blue spectral line and the lowest refractive index for the red spectral line, while the second layer SP2 has the lowest refractive index for the blue spectral line and the highest refractive index for the red spectral line.

The thickness ratio of the two plates SP1, SP2 is proportionate to the ratio of the refractive index differences to the green spectral line. The plate thicknesses can be chosen such that the squared lateral position deviation is minimised over all spectral colours. Such a chromatically corrected Savart plate which is composed of the two plates SP1, SP2, is shown in FIG. 17.

According to the embodiment described above, the light wave multiplexing means comprises at least one polarisation means and at least one birefringent medium SP with presettable optical property. The polarisation means serves to assign to the light which passes through a first modulator cell P01 a presettable first polarisation. The polarisation means further assigns to the light which passes through a second modulator cell P02 a presettable second polarisation. The birefringent medium SP is arranged downstream of the polarisation means and/or the first and second modulator cell P01, P02, seen in the direction of light propagation. The presettable first polarisation can be perpendicular to the presettable second polarisation.

The optical property of the birefringent medium SP is chosen such that the light which passes through the first modulator cell P01 is substantially not deflected by the birefringent medium SP, while the light which passes through the second modulator cell P02 is deflected by a first defined angle at the entry-side interface of the birefringent medium SP. The light which passes through the second modulator cell P02 is deflected by a second defined angle at the exit-side interface of the birefringent medium SP which is coplanar with its entry-side interface. The absolute value of the first angle can be substantially identical to the absolute value of the second angle. The light which passes through the second modulator cell P02 thus leaves the birefringent medium SP substantially at a parallel offset after its passage through the birefringent medium SP.

In FIGS. 6 to 11, 12 to 14, 17, 20 and 21, the optical properties of the deflection layers Vg1, Vg2, Vg3, Vg4, Pg1, Pg2 and, if any, of the provided retardation plates and/or the optical properties of the birefringent media SP, SP1, SP2, SP3, SV1, SV2 are chosen such that the beam deflection, if any, is oriented in a direction which substantially lies in the drawing plane of the respective figure. However, other configurations of the optical properties of involved components are possible, where beams may also be deflected in a direction which is oriented out of the drawing plane of the respective figure. Insofar, a modulated light wave multiplex of a modulation element does not only leave the light wave multiplexing means with a lateral offset in one direction (e.g. along a column of modulator cells), but with a lateral offset in a first and in a second direction.

The birefringent medium SP1 with a normal or anomalous dispersion can be followed in the direction of light propagation by another birefringent medium SP2 with an anomalous or normal dispersion, i.e. a respectively opposite dispersion. This is shown in FIG. 17. The thickness ratio of the two birefringent media SP1, SP2 is then presettable and preferably depends on the refractive index difference ratio of the two birefringent media SP1, SP2 and on the ratio of a presettable wavelength of the light, e.g. green, and at least one further presettable wavelength of the light, e.g. red and blue.

Beam combination in a way similar to that shown in FIG. 8 is also possible when using at least one birefringent medium. This is shown in FIG. 21. For this, the birefringent medium SP1 can be followed in the direction of light propagation by another birefringent medium SP3. The optical property of the further birefringent medium SP3 is chosen such that the further birefringent medium SP3 deflects the light which passes through the first modulator cell P01 by a defined third angle at the entry-side interface of the further birefringent medium SP3 and by a defined fourth angle at the exit-side interface of the further birefringent medium SP3, which is coplanar with its entry-side interface. The further birefringent medium SP3 does substantially not deflect the light which passes the second modulator cell P02. The absolute value of the third defined angle can be substantially identical to the absolute value of the fourth defined angle. The light beams which enter the first birefringent medium SP1 are substantially given a parallel offset when they leave the second birefringent medium SP3. A λ/2 layer is arranged between the two birefringent media SP1 and SP3, said layer turning the direction of polarisation of the light which passes through this layer by 90 degrees. The optical axes of SP1 and SP2 (indicated by double arrows) are oriented at right angles.

A polarisation means WGP with presettable optical property which has the effect of an analyser can be arranged downstream of the birefringent medium SP; SP1, SP2 in the direction of light propagation.

BRIEF DESCRIPTION OF THE DRAWINGS

Now, there are a number of possibilities for embodying and continuing the teachings of the present invention. To this end, reference is made on the one hand to the dependent claims that follow claim 1, and on the other hand to the description of the preferred embodiments of this invention below including the accompanying drawings. Generally preferred physical forms and continuations of the teaching will be explained in conjunction with the description of the preferred embodiments of the invention and the accompanying drawings. The Figures are schematic drawings, where FIG. 9 illustrates the functional principle of a prior art polarisation grating according to cit. [2], FIG. 12 shows an embodiment of the present invention, FIGS. 13 and 14 each show a further embodiment of the present invention.

DETAILED DESCRIPTION OF THE INVENTION

Figure 1:
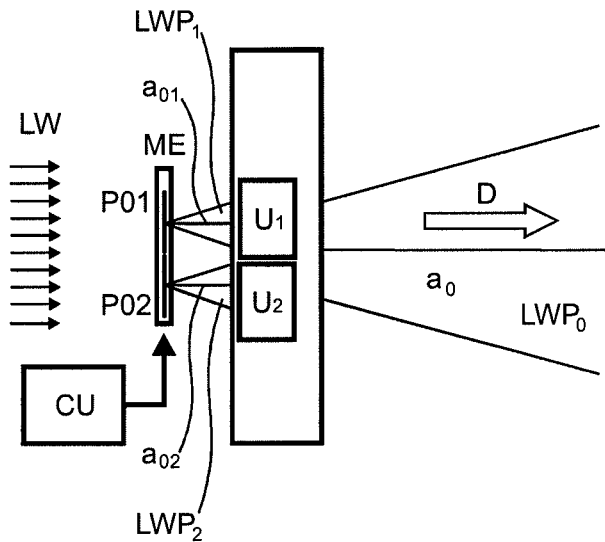
FIG. 1 shows a detail of spatial light modulator device of an embodiment according to this invention.

Since all optical multiplexing means for each of the modulator cells of the modulation array have the same structure, only a single modulator cell of the modulation array will be shown in the drawings referred to below in order to keep the drawings simple and comprehensible.

For the same reason, the optical multiplexing means will be described below with the example of a modulation array with regularly structured modulator cells, where each modulation element comprises two adjacent modulator cells of the modulation array. A typical example of such a spatial light modulator device is a spatial phase-modulating light modulator designed to implement the above-mentioned two-phase encoding method. Generally, the structure can also correspond to a modulation element which comprises more than two modulator cells.

The following embodiments can also be adapted in a comparable way to amplitude modulation. In the latter case, a phase-shifting optical layer would additionally be required for at least one modulator cell per modulation element. If the bias encoding method is employed, a fix phase shift of $\pi/2$ is required for one of the two modulator cells, and if the Burckhardt encoding method is employed, phase shifts of $2\pi/3$ and $4\pi/3$ are required for two of the three modulator cells.

FIG. 1 shows a modulation element ME with a first modulator cell P01 and a second modulator cell P02, both of which being arranged next to each other in a modulation array. A light wave field LW which is capable of generating interference illuminates the modulation element ME in the modulation array. A modulator control unit CU encodes each modulator cell P01, P02 with a phase component of a complex hologram value, so that each modulator cell P01, P02 emits a discretely modulated light wave portion $LWP_1$ and $LWP_2$, respectively, with parallel optical axes $a_{01}$, $a_{02}$ in a direction D in order to generate a holographic reconstruction. According to this invention, an array of optical multiplexing means is arranged as close as possible to the modulator cells P01, P02. The optical multiplexing means comprise a structure of wave deflection means U1, U2, which are spatially assigned to the modulator cells P01, P02. The wave deflection means U1, U2 have optical axes which differ from each other and which are oriented in respect of each other such that the light wave portions $LWP_1$ and $LWP_2$, which come from the same modulation element ME, are combined in the array of optical multiplexing means and form a wave multiplex of a modulated common light wave portion $LWP_0$ with a common optical axis $a_0$.

According to a preferred embodiment of the present invention, the array of optical multiplexing means comprises an optical plate unit of stacked optical plates. The optical plates can for example comprise multiple transparent polymer layers with a presettable optical property—in particular birefringence.

Figure 2:
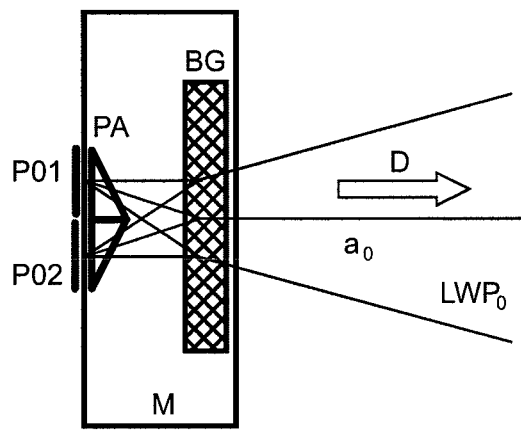
FIG. 2 shows a first embodiment of the optical multiplexing means for spatial multiplexing of exiting modulated light wave portions with an array of micro-prisms and a volume grating.

FIG. 2 shows a first embodiment of such a plate unit, which comprises a micro prism array PA which provides for the modulator cells P01, P02 of each modulation element ME a micro-prism which realises a desired optical wave deflection function for the modulator cells P01, P02. This optical plate unit also combines the light wave portions $LWP_1$ and $LWP_2$ of the modulation elements to form a wave multiplex of a modulated common light wave portion $LWP_0$. This is achieved in that a volume hologram BG, also known as Bragg hologram, is additionally arranged in the optical path of the optical plate unit. This volume hologram BG has the task of preventing an intersection of the propagating light wave portions $LWP_1$ and $LWP_2$ and to lead the two light wave portions $LWP_1$ and $LWP_2$, which have been modulated by the modulator cells P01 and P02 of a modulation element, into direction D without any difference in the optical path lengths. The volume hologram BG is encoded such that is directs light waves with defined wavelengths tightly in a greatly limited deflection angle or exit angle. Any light wavelengths which are required for a colour reconstruction must be considered as defined wavelengths, e.g. the colours red, green and blue.

Figure 3:
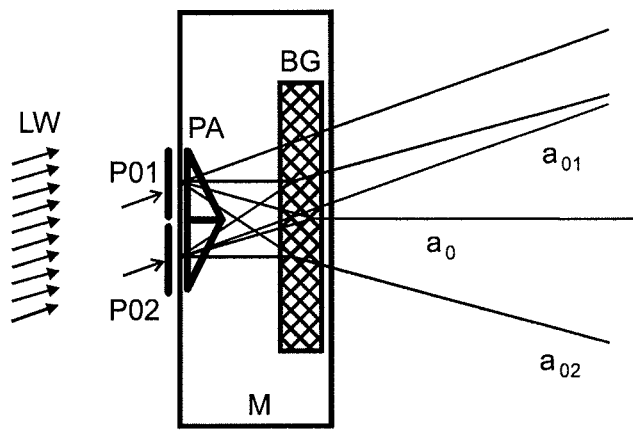
FIG. 3 shows a second embodiment of the optical multiplexing means for spatial multiplexing of exiting modulated light wave portions with an array of micro-prisms and a volume grating, where diffracted light is used.

FIG. 3 shows a second embodiment of the optical plate unit of FIG. 2. The two embodiments differ in the provision or angle of incidence of the light wave field LW which is capable of generating interference. In the embodiment according to FIG. 3, the light which is capable of generating interference hits the spatial light modulator device or the modulator cells P01, P02 at an oblique angle to the optical axis, so that—as a consequence of the oblique angle of incidence—the first diffraction order can be used for reconstruction. In the embodiment according to FIG. 2, the light wave field which is capable of generating interference hits the spatial light modulator device parallel with the optical axis, so that the zeroth diffraction order can be used for reconstruction.

Figure 4:
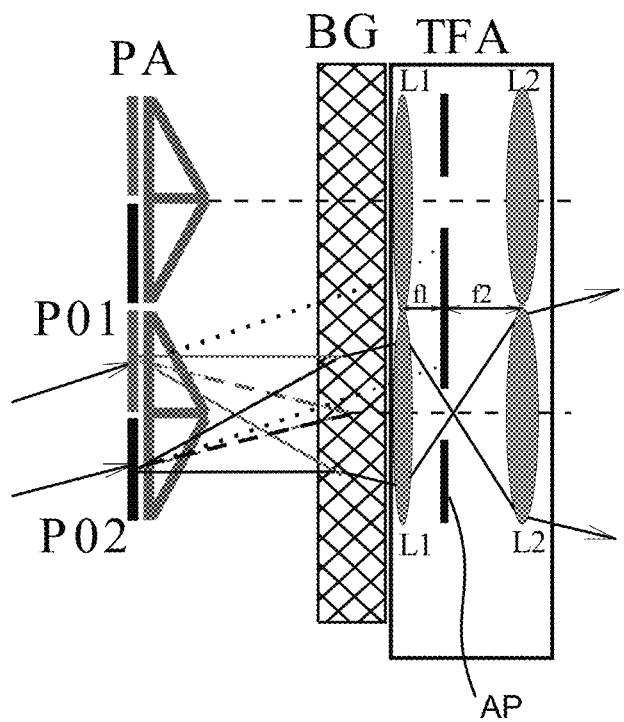
FIG. 4 shows a third embodiment of the optical multiplexing means for spatial multiplexing of exiting modulated light wave portions, where diffracted light is used and where the non-diffracted light is filtered out by a spatial frequency filter with an aperture mask.

Referring to FIG. 4, an additional telescopic filter array (TFA) with an aperture mask AP between two afocally arranged lens arrays systems L1, L2 allows to suppress undesired light portions, e.g. those of neighbouring spatial diffraction orders in respect of the direction of incidence of the light wave field of the 0th diffraction order or of unused periodicity intervals. At the same time, the two afocally arranged lens arrays systems L1, L2 allow the fill factor of the modulator cells of the modulation element ME in the modulation array to be raised due to an optical magnification.

Figure 5:
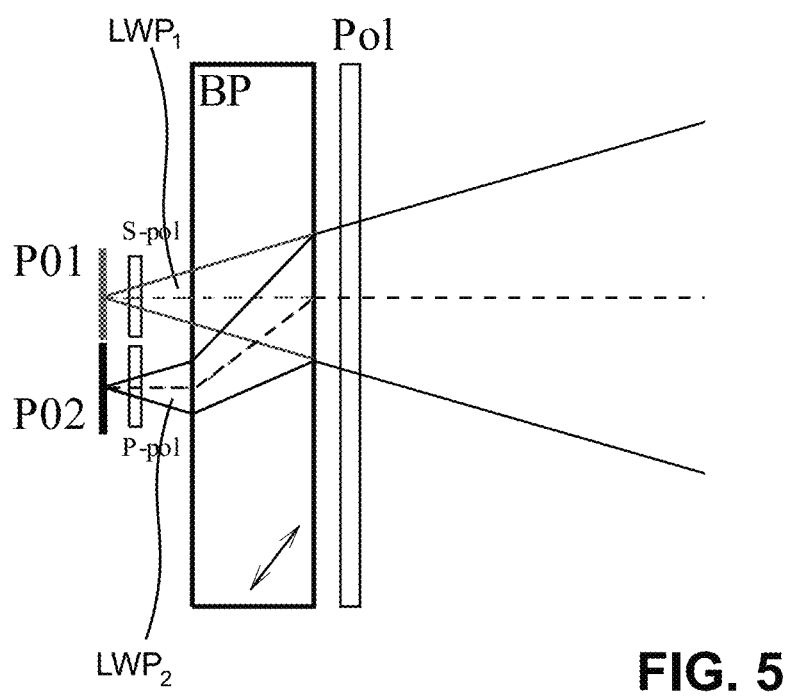
FIG. 5 shows a fourth embodiment of the optical multiplexing means for spatial multiplexing of exiting modulated light wave portions with a polarising light wave splitter.

FIG. 5 shows another embodiment of the present invention, where a polarising light wave splitter Pol combines the light wave portions of each modulation element. The optical multiplexing means for spatial multiplexing use a plate with polarisation elements Spol and Ppol, which assign to each light wave portion of a modulator cell P01, P02 in the modulation element a discrete light polarisation, combined with a birefringent coplanar plate BP, which assigns to all modulated light wave portions $LWP_1$, $LWP_2$ of a modulation element a discrete inclined optical axis. The optical axes of all light wave portions are inclined in respect of each other and the strength of the coplanar plate BP is chosen such that all light wave portions are superposed at its exit-side interface.

Figure 6:
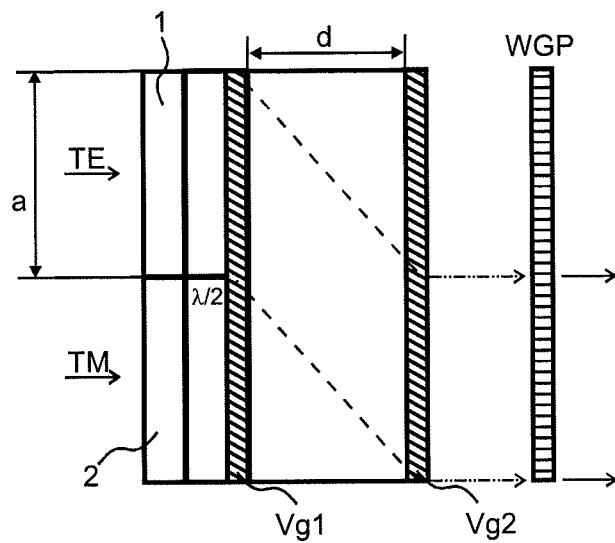
FIGS. 6 to 8 show embodiments of the optical multiplexing means with a polarising beam splitter which is compensated in respect of changes in the light wavelengths.

A polarising light wave splitter, as shown in FIG. 6, is very sensitive to changes in the wavelength which is chosen to generate the holographic reconstruction. A lateral offset which is dependent on the wavelength of the used light and a change in the phase relation of the light are obtained.

Figure 7:
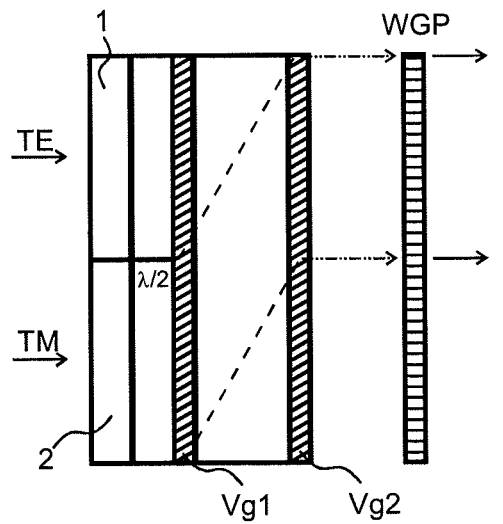
Figure 8:
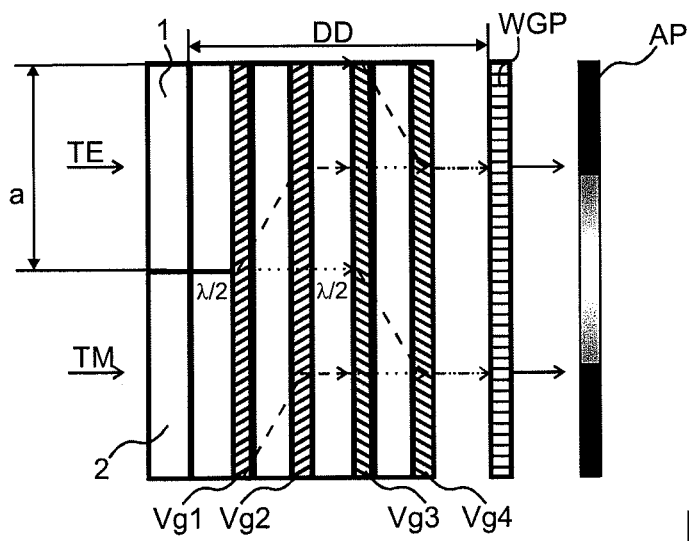
Figure 10:
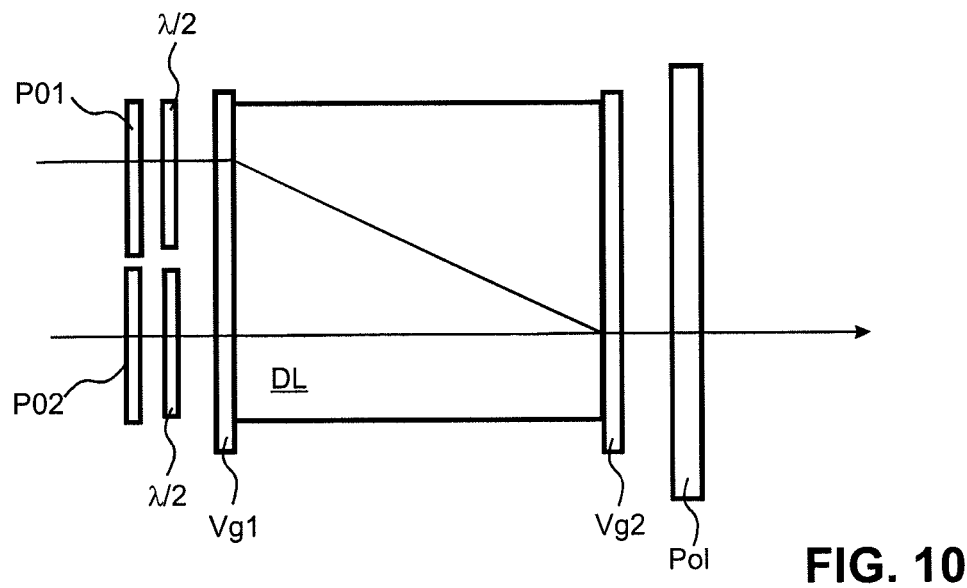
FIG. 10 shows the beam path in a volume grating (non-symmetrical)
Figure 11:
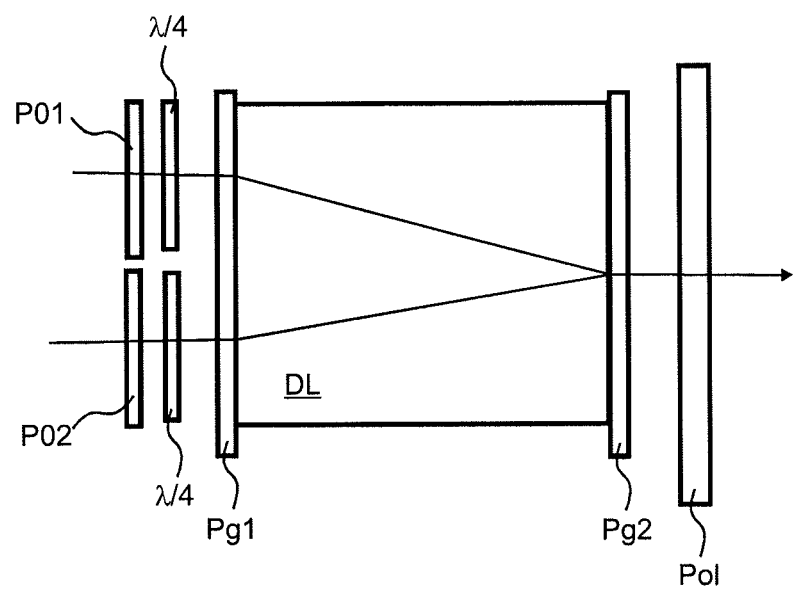
FIG. 11 shows the beam path in an arrangement with polarisation gratings (symmetrical)
Figure 13:
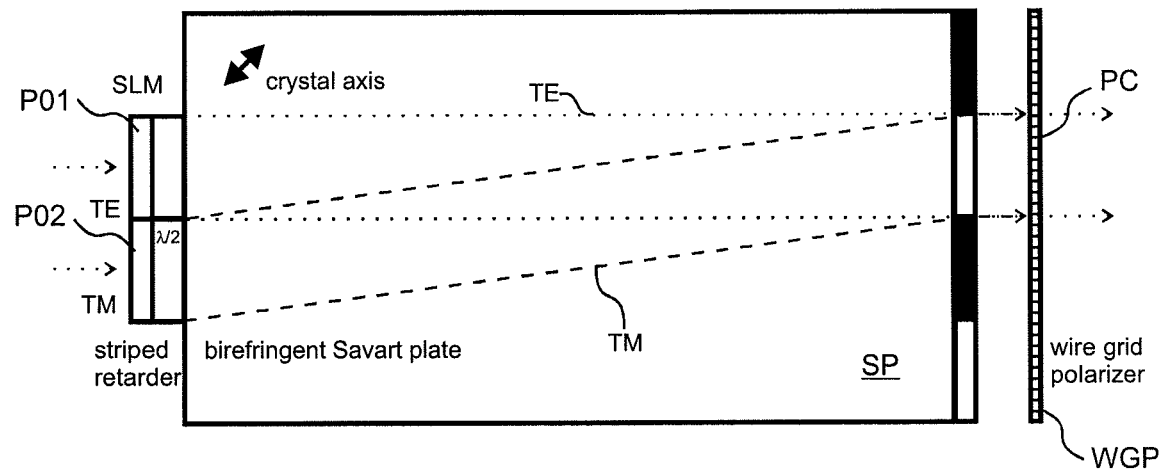
Figure 14:
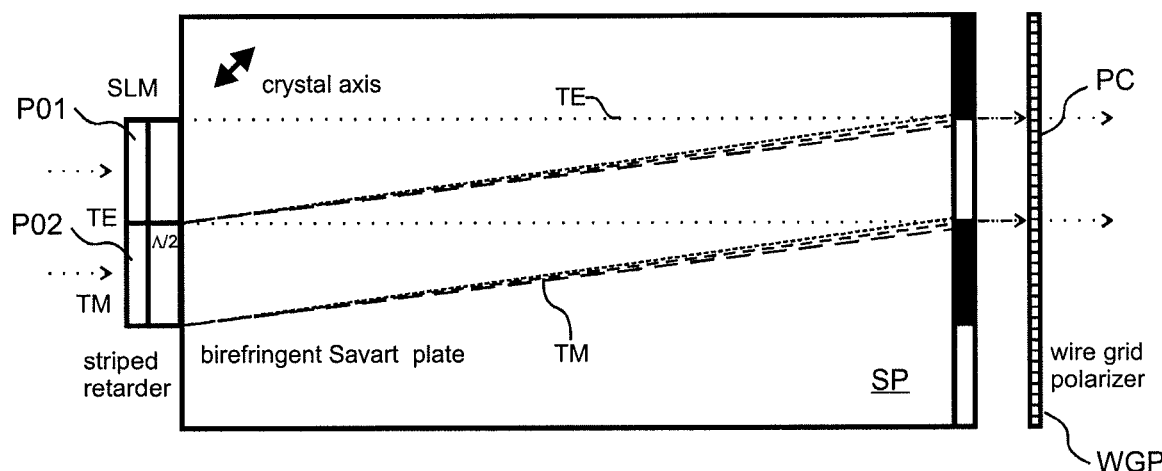
Figure 15:
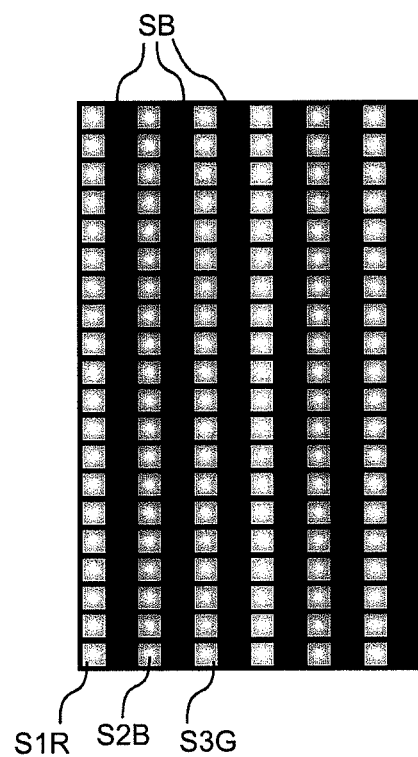
FIG. 15 illustrates space division multiplexing of phase pixels which are combined to form complex-valued pixels.
Figure 16:
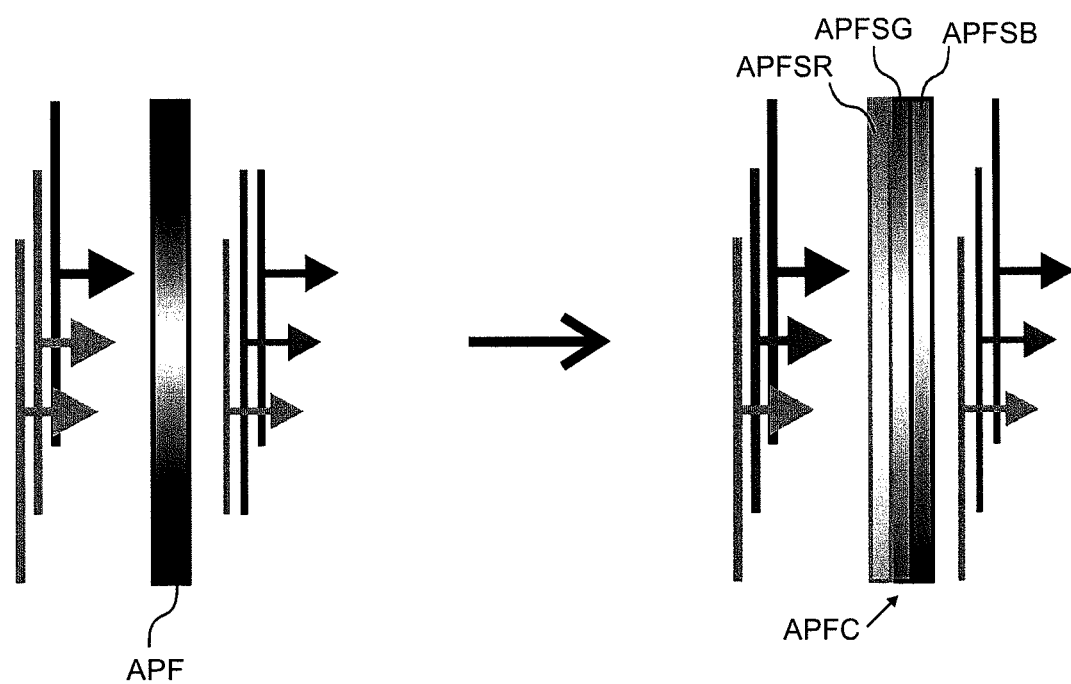
FIG. 16 shows a 'neutral density' apodisation function (left) and a laterally offset, colour-sensitive apodisation function (right), and FIGS. 17 to 22 each show a further embodiment of the present invention.

FIGS. 6 and 7 show two embodiments which illustrate the fundamentals of realising a self-compensating beam splitter double plate according to FIG. 8. Vg1 and Vg2 denote volume gratings which serve as beam splitters.

The distance d between the two parallel grating planes must be d=a/(2·cos($\pi$/2)), i.e. 0.57735 µm per µm modulator cell width, in order to achieve a complete superposition of the light wave portion TE of modulator cell 1 and light wave portion TM of modulator cell 2, both of which having the width a, downstream of the planar polarising beam splitter Vg2.

Assuming 50 µm wide modulator cells, a thickness d=28.87 µm can be achieved with the 0°/60° geometry of the polarising beam splitters, while in comparison with that a Savart plate must have a minimum thickness of 385.8 µm if $\Delta n=0.2$ is to be obtained.

The pointing vectors of the polarised light wave portions TE and TM will be parallel downstream of the polarising beam splitter if they were parallel upstream of the polarising beam splitter. The parallelism of the exiting beams should therefore not be a problem here.

However, wavelength fluctuations of the light are problematic. Given a modulator cell width of 30 µm and, consequently, a thickness of the polarising beam splitter double plate of 17.32 µm, a wavelength deviation of $\Delta\lambda=1$ nm will result in a relative phase difference between the two superposed modulator cells of about $2\pi/10$. In order to solve this problem, it is possible to choose a polarising beam splitter geometry with lower diffraction angle.

A possible polarising beam splitter deflection geometry (with polarising beam splitters Vg1, Vg2) is 0°/48.2°, as shown in FIG. 6. The light wave portion TE is deflected, while the light wave portion TM is not deflected in this example. FIG. 7 illustrates a 0°/41.2° polarising beam splitter (Vg1, Vg2) which transmits TE-polarised light without deflection, while it diffracts or deflects TM-polarised light.

Given a modulator cell width of $a=50$ µm and a maximum permitted distance to a plane of EW prisms (not shown), as regards cross-talking among neighbouring modulator cells, of $D_{max}=5\times a=250$ µm, it follows $\theta_{min}=\arctan(a/D_{max})=\arctan(0.2)=11.31°$. At $\Delta n=0.2$, the Savart plate achieves about 7.4°.

Since the possible polarising grating beam splitter geometries are mathematically terms of a series, there are also usable angles in a range around 11°. The required refractive index variation is then very high though, i.e. usage of 11° as polarising beam splitter geometry is deemed rather unrealistic.

However, a polarising beam splitter geometry of 0°/33.557° is not unlikely to be realised in practice, where there must still be a refractive index variation reserve for RGB multiplexing. At a stability of the wavelength of $\Delta\lambda=1$ nm, this geometry would correspond with a relative phase difference of the combined modulator cell beams of $\Delta\varphi<2\pi/20$.

There are a number of possibilities to compensate the effect of a possibly drifting key wavelength.

One possibility is to use the generated summed signal of the two combined modulator cells in order to compensate the phase shift simply and easily during operation. For this, the phase of one modulator cell can for example be shifted such that as a result a certain target intensity is achieved. This produces a value for a corrective phase to be introduced.

Further, it is possible to introduce a set of phase shifts, i.e. at least three, in order to determine with the help of phase-shifting interferometry the relative phase of the combined modulator cell with an accuracy of $<2\pi/512$.

In displays which only comprise few light sources, it presents itself to use two diodes per wavelength and light source which have spectrally different characteristics. If the characteristic lines are known, then the wavelength can be determined with an accuracy of <0.1 nm from the signals of the diodes. This principle is for example employed in the wavelength measuring device WaveMate™ supplied by the company Coherent.

When the key wavelength is known, the relative phase to be set in the combined modulator cells can be corrected directly if the key wavelength drifts. This should result in a remaining error of $<2\pi/256$ when setting the relative phase in the combined modulator cells.

The above-mentioned approaches for online correction can be combined with each other in order to improve the measurement accuracy and thus to compensate the effect of a wavelength drift. Irrespective of that, a laser can also be stabilised to $\Delta\lambda<0.1$ nm.

FIG. 8 shows an embodiment of a compensated polarising beam splitter. Here, TM-polarised light is diffracted and TE-polarised light is not with the first two beam splitters Vg1 and Vg2, which compares to the arrangement shown in FIG. 7. Further, TE-polarised light is diffracted and TM-polarised light is not with the other two beam splitters Vg3 and Vg4, which compares to the arrangement shown in FIG. 6. The distance between the individual beam splitters Vg1 to Vg4 can here be less than in the embodiments shown in FIGS. 6 and 7, because only half the beam offset must be achieved for the TE- and TM-polarised light.

FIG. 8 further shows how a compensation of a drift of the light wavelength can be achieved. The compensation of $\Delta\varphi_{rel}(\Delta\lambda)$ is based on the fact that this effect is equally distributed over the combined modulator cells. Since the required retardation layers (one structured and one plane, unstructured) are only about 1.5 µm thick, the resultant distance between SLM and polariser WGP is DD<2a (applies to a ~50 µm), even if the thickness of the volume gratings Vg1, Vg2, Vg3 and Vg4, which are arranged in four planes, cannot be neglected (each about 10 µm thick). If a=70 µm, then the resultant thickness DD<a. If a=20 µm, DD is less than 3a, which makes it still possible for small modulator cells to use polarisers other than wire grid polarisers.

Referring to FIG. 6, a $\lambda/2$ plate is drawn between the modulator cell 2 and the volume grating Vg1. Providing a $\lambda/2$ plate becomes necessary when the light which falls on the modulator cells 1, 2 only has one presettable polarisation, e.g. a linear TE polarisation. In that case, the polarisation of the light which passes through the modulator cell 2 is turned by the $\lambda/2$ plate by 90 degrees, so that the light which passes through the modulator cell 1 is given a polarisation that is perpendicular to that of the light which passes through the modulator cell 2. If the light which falls on the modulator cells 1, 2 already has a perpendicular polarisation, the provision of a $\lambda/2$ plate between the modulator cell 2 and the volume grating Vg1 is not necessary. In other words, it is important that the light which passes through the modulator cell 1 has a different—e.g. perpendicular—polarisation than the light which passes through the modulator cell 2, so that the light which passes through one modulator cell is deflected by the volume grating Vg1, and the light which passes through the other modulator cell is not deflected by the volume grating Vg1. What has been said above also applies to FIGS. 7, 8, 13, 14 and 17 in a similar way.

The angular geometry does not have to be met with an accuracy of <0.05°. An error of 0.1° is uncritical. If D<a, angle errors of 0.3° are uncritical, i.e. even if a measurement is necessary to compensate the resultant effects. This is due to the fact that the portion of non-diffracted light is blocked in the plane of the apodisation filter APF if D<a.

However, it is necessary or at least recommended to accept the sandwich part which comprises two volume gratings of like geometry as such. A lateral offset of the wave fronts which are to be superposed is unproblematic, because the fill factor of the apodisation filter APF is smaller than the fill factor of the phase-modulating SLM, i.e. $FF_{APO}<FF_{SLM}$. The dimension of the light-emitting area is thus constant, this area is sufficiently homogeneously illuminated and comprises only common superposed wave front portions, i.e. a lateral offset of as much as 5% would be unproblematic. In other words, a lateral offset of the light wave portions which leave the modulation element ME can be compensated with the help of a filter or shutter, e.g. an apodisation filter APF with a defined transmittance characteristic or an aperture mask with a defined mask geometry, which is arranged downstream of that modulation element ME. This can also be applied to the embodiments according to FIGS. 5 to 7.

Refractive Beam Combination with Lenses or Prisms

Now, another possibility of refractive beam combination will be described which is based on the use of lenses and/or prisms, or lenticulars and/or prism arrays.

Figure 18:
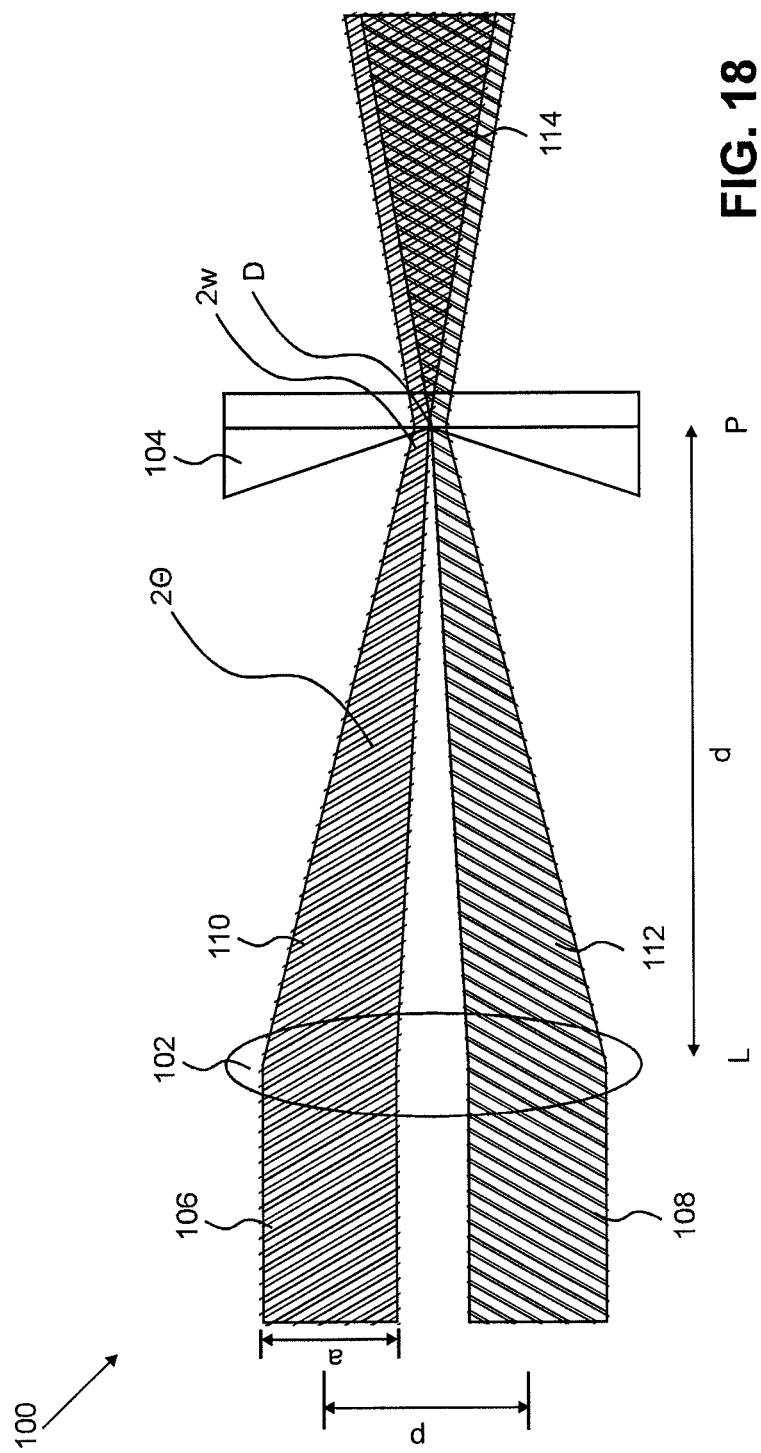

FIG. 18 illustrates an embodiment and shows in a top view a detail of an optical system 100 which comprises a lenticular L and a prism array P. A lens 102 of the lenticular L and a prism 104 of the prism array P are both assigned to two pixels of the SLM (not shown in FIG. 18). The drawing shows the beams 106, 108 coming from two mutually assigned pixels, a lens 102 of the lenticular L and a prism 104 of the prism array P. The pixel pitch is denoted by p, the diameter of one beam 106, 108 upstream of the lens 102 is denoted by a, and the distance between lenticular L and prism array P is denoted by d.

Lens 102 focuses the light of each beam 106, 108 and converges the two beams 106, 108. The distance d is somewhat smaller than the focal length of lens 102, so that the focussed beams 110, 112 are a small distance D apart in the plane of the prism array P. The two beams 110, 112 hit different sides of a prism 104. The prism angle is chosen such that the beams 114 substantially run in the same direction downstream of the prism. The drawing shows the double angle of divergence 2Θ and the double beam waist 2w.

In this arrangement the two beams 106, 108 do not fully converge, but remain a narrow distance D apart. However, this distance is much smaller than the original distance, which equals the pixel pitch. Therefore, the difference in the optical path length of the light towards the edge of a diffraction order is much smaller, which greatly improves the reconstruction quality.

Now, a numerical example will be provided under the simplifying assumption that the distance d between lenticular L and prism array P equals the focal length f, i.e. d=f. Further, the beams are assumed to be Gaussian beams. The pixel pitch is p=50 μm. The distance of the beams is to be minimised from p=50 μm to D=p/10=5 μm. The beam waist is chosen such that D=2·w.

The following relations apply:

$\Theta^* w = \lambda/\pi$ (beam parameter product of a Gaussian beam=ratio of divergence and beam waist of a Gaussian beam)

$a = 2\Theta^* f$ $D = 2w$

If with the help of this arrangement the distance p of the beams is reduced from 50 μm to 5 μm, then a focal length f=0.31 mm will result for a wavelength of 500 nm. The radius of the lenses would thus be about 0.15 mm at a lens pitch of 0.1 mm.

Lenticulars L and prism arrays P are optical components which can be made and aligned in large sizes. They serve to substantially reduce the distance of the two beams 106, 108 and thus to improve the reconstruction quality.

Figure 19:
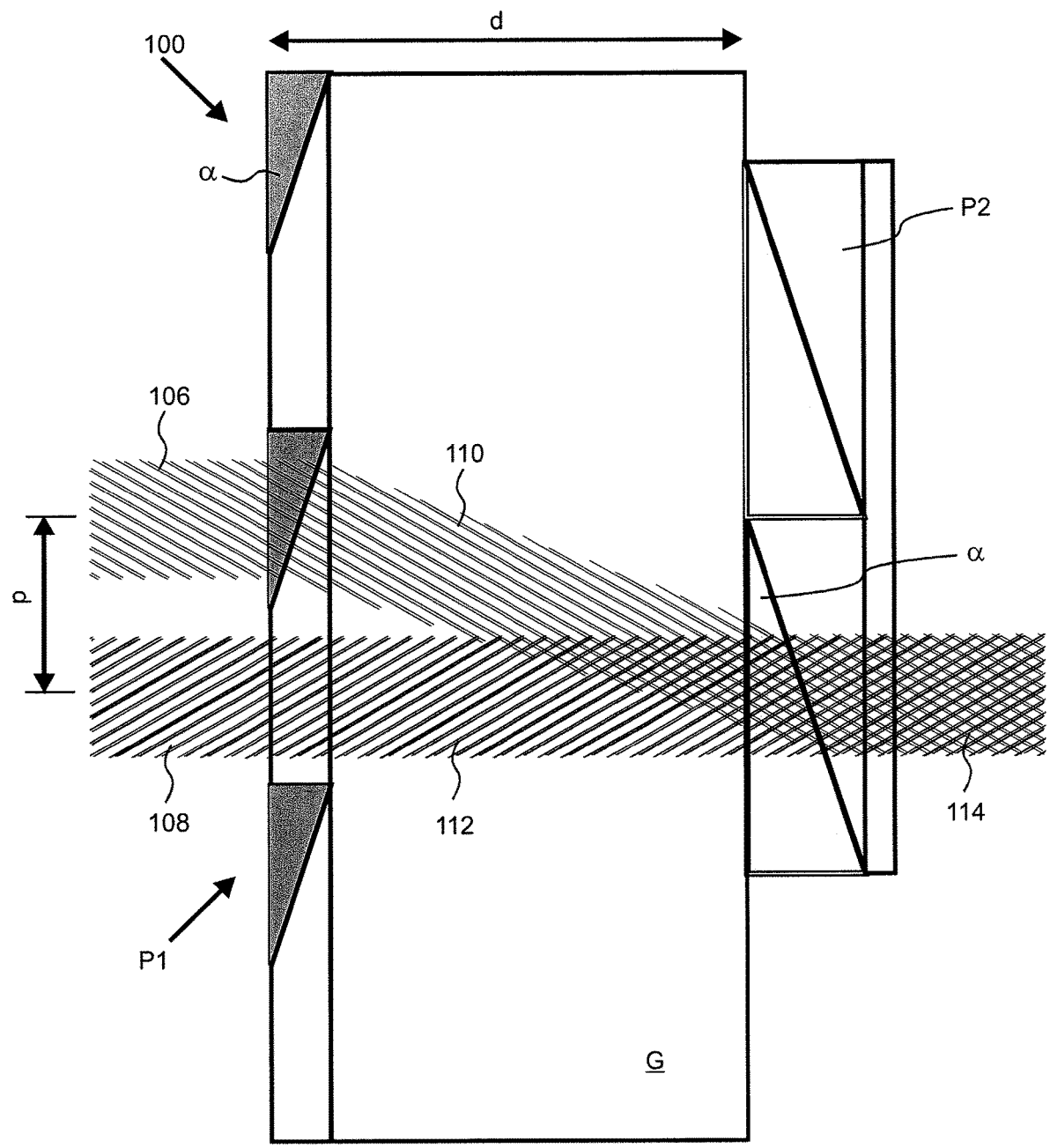

FIG. 19 illustrates another embodiment and shows in a top view a detail of an optical system 100 which comprises two prism arrays P1 and P2 and a spacer glass plate G with a thickness d. The drawing shows two beams 106, 108 coming from mutually assigned SLM pixels (not shown), said beams comprising perpendicular polarisation directions after having passed a structured retardation plate (not shown).

The first prism array P1 is made of an isotropic material. In contrast, the second prism array P2 is made of a birefringent material. One direction of polarisation is transmitted as an ordinary beam 108, 112 without being deflected, while the perpendicular direction of polarisation is deflected as an extraordinary beam 106, 110. This is similar to the birefringent lenticulars which are used by the company Ocuity for switchable 2D/3D displays. The ordinary refractive index is chosen to be equal to the refractive index of the surrounding material. In contrast, the extraordinary refractive index is chosen to be different, so that the extraordinary beam is deflected.

The lower beam 108 passes through the prism array P1 without being deflected, because it hits the planar interface. On entry into the spacer glass plate G it is denoted by 112; it is not deflected by the prism array P2 either, because it has the direction of polarisation of an ordinary beam. The upper beam 106 is deflected by both prism arrays, P1 and P2, because it is the extraordinary beam. Both beams 106, 108 are thus combined and leave the optical system in the form of a superposed light beam 114 in the same direction.

Now, a numerical example will be given with a pixel pitch of p=50 μm. The thickness of the glass plate is assumed to be d=500 μm. In this arrangement, the upper beam 106 must be deflected in each prism array P1 by δ=5.7°. For small angles, the following relation applies:

$\delta = (n_1/n_2 - 1)^* \alpha$ where α is the prism angle and $n_1$ and $n_2$ are the refractive indices of the prism P1 and of the surrounding material, i.e. the glass G. Typical values are $n_1$=1.65 and $n_2$=1.5, i.e. there is a refractive index difference of Δn=0.15. This results in a required prism angle of α=57°.

The company Ocuity has already produced birefringent lenticulars of a size of several inches for an application that is different from the one described here. A sandwich of commercially available prism array, spacer glass plate and birefringent prism array can thus me made in a large size in order to achieve beam combination.

The light wave multiplexing means can thus comprise a lens means and a prism means (see FIG. 18). The light 106 which passes though a first modulator cell can be focussed by the lens means in a first region in a plane that lies downstream of the lens means in the direction of light propagation. The light 108 which passes through a second modulator cell can be focussed by the lens means in a second region in that plane. The prism means is arranged at the plane. The prism means is designed such that the light of the first region is deflected by the prism means into a first presettable direction, and the light of the second region is deflected into a second presettable direction. The first and the second presettable direction are substantially identical. The first region is arranged at a distance to the second region. The lens means comprises a lenticular L, and the prism means comprises a prism array P.

The light wave multiplexing means according to FIG. 19 comprises a first prism means and a second prism means. The light 106 which has passed a first modulator cell can be deflected by the first prism means into a first direction. The light 108 which has passed a second modulator cell is not deflected. The first prism means is followed in the direction of light propagation by the second prism means at a defined distance d. The second prism means is designed such that the light 110 which has been deflected by the first prism means can be deflected by the second prism means into a presettable direction. The light 112 which has not been deflected is not deflected by the second prism means.

The second prism means comprises a prism array P2 with birefringent prism elements. The light 106 which passes through the first modulator cell is polarised such that it can be deflected by a birefringent prism element of the second prism means. The light 108 which passes through the second modulator cell is polarised such that it is not deflected by the second prism means.

The first prism means comprises a prism array P1 with prism elements. The prism elements are arranged such that only the light 106 which passes though the first modulator cell is assigned to a prism element, and that the light 108 which passes though the second modulator cell is not assigned to a prism element.

Figure 20:
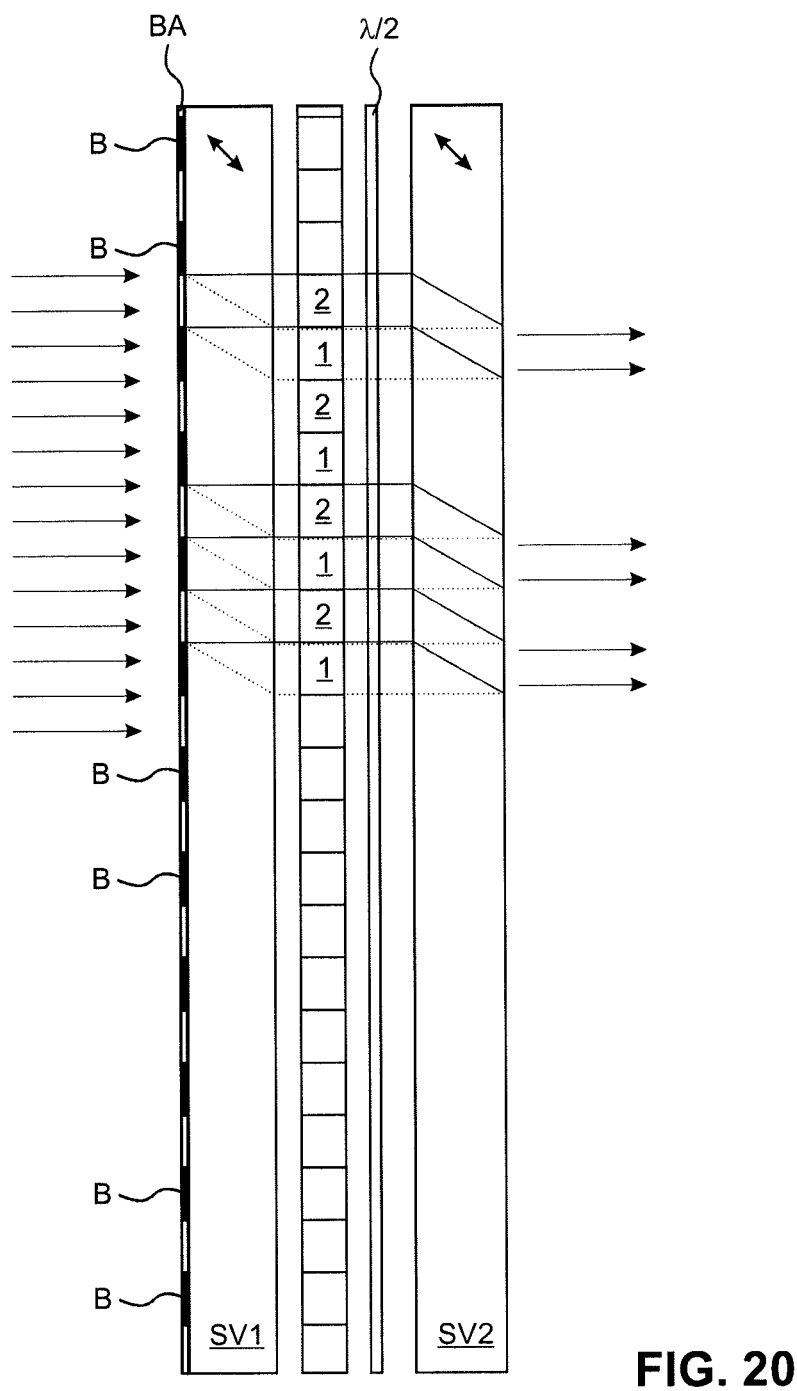

FIG. 20 shows another embodiment of the present invention. Here, the light wave multiplexing means comprises at least two birefringent media SV1, SV2. One birefringent medium SV1 is arranged upstream of the modulator cells 1, 2, seen in the direction of light propagation, and another birefringent medium SV2 is arranged downstream of the modulator cells 1, 2. The birefringent media SV1, SV2 each have a presettable optical property. The optical property of the birefringent medium SV1, which is arranged upstream of the modulator cells 1, 2, is chosen such that a first portion of the light is deflected by a first defined angle towards the first modulator cell 1. In an upper section of FIG. 20, the beam diameter of this light portion is indicated by dotted lines. Two further beams are drawn in below, and all beams shall be construed to be like this across the entire surface of the element. Another portion of the light is not deflected. The beams of these light portions are indicated by full lines. The optical property of the birefringent medium SV2, which is arranged downstream of the modulator cells 1, 2, is chosen such that the other portion of the light is deflected by a second defined angle and that the first portion is not deflected. The optical property of the two birefringent media SV1, SV2 shall in particular be understood to be the orientation of the optical axis or major axis of the respective birefringent medium SV1, SV2. The optical axes of the two birefringent media SV1, SV2 are indicated by double arrows and have substantially the same orientation. There are other thinkable configurations, where the orientation of the optical axes of the two birefringent media SV1, SV2 do not lie in the drawing plane of FIG. 20. Although it is generally possible that the light which runs towards the first birefringent medium SV1 is not polarised, it is preferably provided that the light which falls on the first birefringent medium SV1 has a defined linear polarisation.

The two birefringent media SV1, SV2 in FIG. 20, but also the birefringent media SP, SP1, SP2 and SP3 in FIGS. 13, 14, 17 and 21, have substantially coplanar interfaces.

Referring to FIG. 20, a retardation plate in the form of a λ/2 plate is arranged between the two birefringent media SV1, SV2. This retardation plate turns the direction of polarisation of the light which passes through the modulator cells 1, 2 by 90 degrees.

An aperture mask BA is arranged upstream of the first birefringent medium SV1, seen in the direction of light propagation, said aperture mask being designed such that the non-deflected portion of the light, which would propagate towards each modulator cell 1, is blocked out. In other words, the aperture mask BA comprises individual apertures which have substantially the same cross-sectional area as the modulator cells 1, 2. Now, the aperture mask is positioned such that every other modulator cell, i.e. all modulator cells 1 are covered so that no light falls on them. This is to prevent that non-deflected light passes through the modulator cells 1. The individual components are shown separately in FIG. 20 in order to keep the drawing comprehensible. However, the components can be combined in the form of a sandwich, i.e. be in direct contact with each other.

Figure 17:
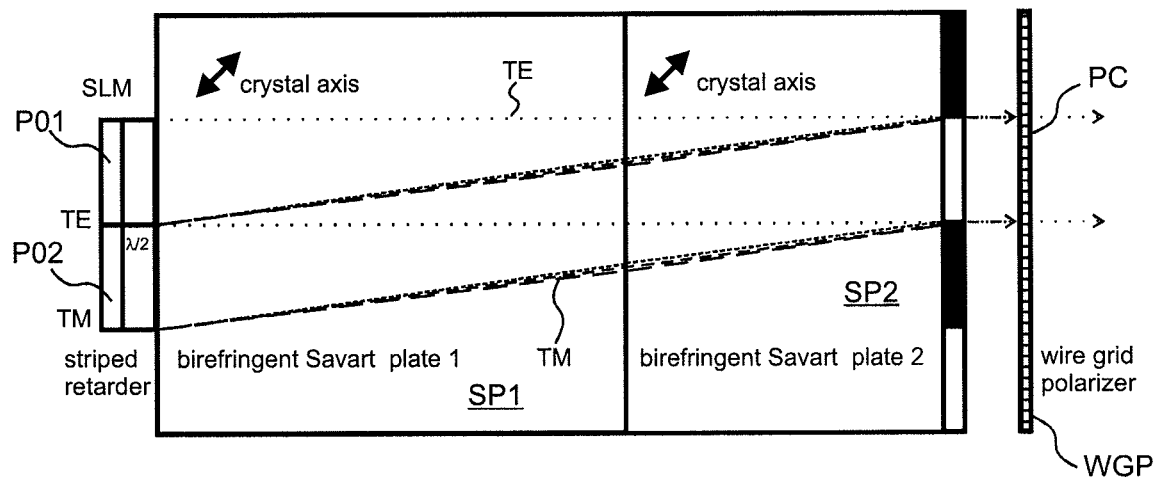
Figure 21:
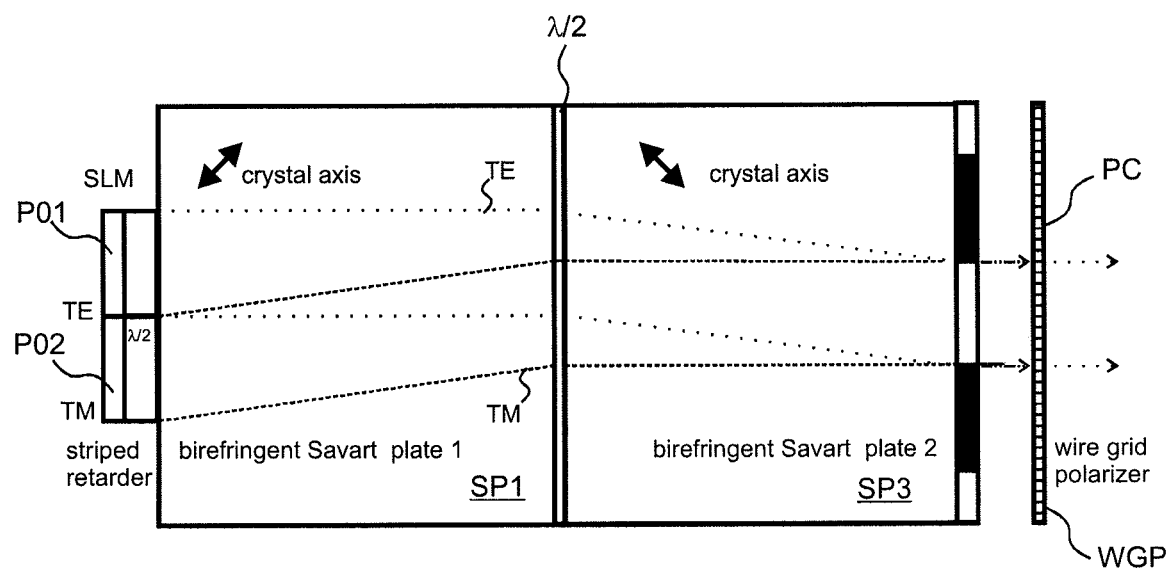

In the arrangement shown in FIG. 20, the distance between the modulator cells 1, 2 and a further optical element which is arranged downstream of the birefringent medium SV2 (e.g. a deflection prism cell arrangement or an apodisation filter, not shown in FIG. 20) can preferably be reduced compared with an arrangement for example as shown in FIG. 17. The arrangement shown in FIG. 20 is particularly preferable for beam combination of spectrally broad-band light, but can also be used for spectrally narrow-band light. An arrangement shown in FIG. 20 serves to realise a symmetrical beam splitting and beam combination, which can serve to minimising the deviation of the optical path lengths on the one hand and/or of the superposed, i.e. combined wave fronts on the other. It can thus be achieved that the diffraction patterns of the two superposed modulator cells 1, 2 comprise the same intensity and phase distributions (except the orthogonality of the polarisation state) at the point of exit of the light modulator device. This is a major aspect for a high-quality hologram reconstruction, if such a light modulator device is used in a holographic display. Similarly, minimising cross-talking of light which passes through two adjacent modulator cells 1, 2 of the arrangement is another important aspect of high-quality hologram reconstruction.

Figure 22:
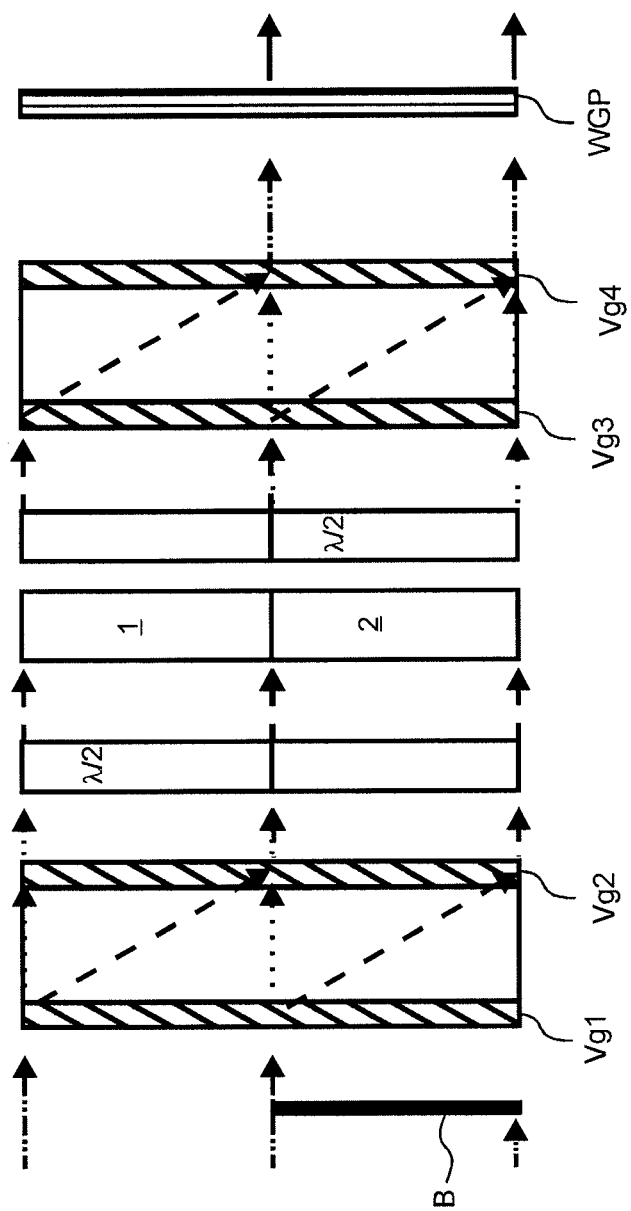

FIG. 22 shows another embodiment which serves to realise a similar function as the embodiment shown in FIG. 20. The embodiment shown in FIG. 20 uses refractive components, namely the two birefringent media SV1 and SV2. In contrast, the embodiment shown in FIG. 22 uses diffractive components, namely the deflection layers Vg1, Vg2, Vg3 and Vg4 shown in the drawing, which are realised in the form of volume gratings. The deflection layers Vg1, Vg2 are arranged upstream of the modulator cells 1, 2, seen in the direction of light propagation. The deflection layers Vg3, Vg4 are arranged downstream of the modulator cells 1, 2, seen in the direction of light propagation. The light which falls on the first deflection layer Vg1, i.e. which is not blocked by the cover B, is not polarised but shows a homogeneous distribution of individual polarisation portions, or is has a defined polarisation state, e.g. a linear polarisation.

The first deflection layer Vg1 is designed such that the light is split up into two partial beams. The one partial beam is substantially not deflected and it is linearly polarised, i.e. has for example a TE polarisation; it is indicated by dotted lines in the drawing. The other partial beam is deflected by a defined angle and it is also linearly polarised, but has for example a TM polarisation; it is indicated by broken lines in the drawing. The second deflection layer Vg2 is arranged parallel to the first deflection layer Vg1, and it is designed such that the light which has not been deflected is not deflected and the light which has been deflected by the defined angle is deflected by another angle. The absolute values of the two deflection angles are substantially identical, namely 60°. The direction of polarisation of the light which has not been deflected is turned by 90 degrees by the structured retardation plate, which is realised in the form of a λ/2 plate and which is arranged downstream of the second deflection layer Vg2. Consequently, the light which passes through the modulator cells 1, 2 has a substantially identical polarisation state.

The modulator cells 1, 2 are designed such that they can modify the phase of the light which interacts with them. A further structured retardation plate in the form of a λ/2 plate is arranged between the modulator cells 1, 2 and the third deflection layer Vg3, said plate turning the direction of polarisation of the light which passes through the modulator cell 2 by 90 degrees. The light falls on the third deflection layer Vg3, which is designed such that the light which passes through the modulator cell 2 is substantially not deflected, and the light which passes through the modulator cell 1 is deflected by a defined angle. The fourth deflection layer Vg4 is arranged parallel to the third deflection layer Vg3, and it is designed such that the light which has not been deflected by the third deflection layer Vg3 is not deflected and the light which has been deflected by the third deflection layer Vg3 by the defined angle is deflected by another angle. The absolute values of the two further deflection angles are substantially identical. In this respect, the light beams which pass though the two modulator cells 1, 2 are thus combined and propagate substantially in the same direction. If the two modulator cells 1, 2 realise substantially the same phase value, the optical path lengths of the two partial beams are substantially identical.

There are modulator cells 1, 2, or SLMs, which do not require a defined entry polarisation. In that case, it is possible to omit the structured retardation plate upstream of the modulator cell plane and to replace the second structured retardation plate, which is arranged immediately downstream of the modulator cell plane, by an unstructured retardation plate, i.e. an unstructured half-wavelength plate.

For an RGB presentation—i.e. when using light of different wavelengths—it is possible to expose three different volume gratings, each being adapted to an individual wavelength, in an interleaved manner in each of the deflection layers Vg1-Vg4. The arrangement shown in FIG. 22 is of course also thinkable complemented in the form of columns, lines or matrices, namely when the components which are shown in FIG. 22 continue above and below and/or out of the drawing plane—very much like in FIG. 20.

The light wave multiplexing means are typically arranged immediately downstream of the modulator cells of the modulation array, seen in the direction of light propagation, in the drawings. However, it is also possible to arranged the light wave multiplexing means shown in the drawings at a different position. For example, another optical component can be arranged between the modulation array and the light wave multiplexing means. A light wave multiplexing means as shown in the drawings and as claimed in the claims, can thus be arranged downstream of that further optical component, seen in the direction of light propagation. Such a further optical component can for example be an illumination unit as disclosed in documents DE 10 2009 028 984.4 or PCT/EP2010/058619. The light which is injected into this illumination unit can for example leave at right angles to its surface (which is arranged parallel to the modulation array) and propagate onto a reflection-type modulation array. Once the light which comes from the illumination unit has been modulated by the modulator cells of the modulation array and reflected—for example by a reflective layer of the modulation array, the modulated light passes through the illumination unit substantially without being deflected and then falls on the light wave multiplexing means. In this case, the light wave multiplexing means is arranged on the side of the illumination unit which faces away from the modulation array. To enable the light which is modulated and reflected by the modulation array to pass through the illumination unit without any obstructions, a film is provided between the illumination unit and modulation array which turns the direction of polarisation for example by 45° whenever the light passes through it.

Finally, it must be said that the embodiments described above shall solely be understood to illustrate the claimed teaching, but that the claimed teaching is not limited to these embodiments.

CITATIONS

[1] Chulwoo Oh and Michael J. Escuti: Achromatic polarization gratings as highly efficient thin-film polarizing beamsplitters for broadband light, Proc. SPIE, vol. 6682, no. 628211, 2007

[2] Jihwan Kim et al.: Wide-angle nonmechanical beam steering using thin liquid crystal polarization gratings, Proc. SPIE, vol. 7093, no. 709302, 2008

The invention claimed is:

1. A display device comprising:
   A spatial light modulator device comprising a first pixel outputting a first modulation light by modulating a phase of a first polarized light and a second pixel outputting a second modulation light by modulating the phase of the first polarized light, wherein the second pixel is adjacent to the first pixel;
   A beam combiner changing a path of the first modulation light outputted from the first pixel so that the path of the first modulation light is parallel to a path of the second modulation light outputted from the second pixel to form a combined path from the first and the second modulation light and to complex modulate the first modulation light with the second modulation light, and
   A phase of the first modulation light is different from a phase of the second modulation light.

2. The display device according to claim 1, further comprising:
   A light source device illuminating the first polarized light to the spatial light modulator device; and
   At least one retardation plate including a light pass plate passing the first modulation light outputted from the first pixel as it is and a half-wave plate retarding the phase of the second modulation light outputted from the second pixel.

3. The display device according to claim 2, wherein the half-wave plate is opposite to the second pixel.

4. The display device according to claim 1, wherein a half-wave plate or a quarter-wave plate is opposite to the first pixel and to the second pixel.

5. The display device according to claim 1, further comprising a polarizer provided downstream of the beam combiner.

6. The display device according to claim 5, wherein the polarizer has an orientation of a transmittance direction of 45°.

7. The display device according to claim 5, wherein the polarizer has an orientation of a transmittance direction of 0° or 90°.

8. The display device according to claim 5, wherein the first modulation light is a vertical polarized light, where the second modulation light is a horizontal polarized light.

9. The display device according to claim 1, wherein the beam combiner comprises deflection layers, where a first deflection layer changes the path of the first modulation light into a direction of the path of the second modulation light, where a second deflection layer changes the path of the first modulation light so that the first modulation light is outputted from the beam combiner parallel to the second modulation light.

10. The display device according to claim 1, wherein the beam combiner comprises birefringent optical components.

11. The display device according to claim 9, wherein the beam combiner comprises a spacer between the first deflection layer and the second deflection layer.

12. The display device according to claim 1, wherein an aperture mask is provided for blocking a portion of the first and second modulation lights.

13. The display device according to claim 12, wherein a cover of the aperture mask is formed opposite to the first pixel or the second pixel.

14. The display device according to claim 1, wherein the first polarized light, the first modulation light and the second modulation light are parallel.

15. The display device according to claim 1, wherein at least one light source emits a laser beam.

16. The display device according to claim 1, wherein the spatial light modulator device comprises a liquid crystal layer between two substrates.

17. The display device according to claim 1, wherein a difference in optical path lengths between a portion of light passing the first pixel and a portion of light passing the second pixel is corrected by an offset phase.

* * * * *